(12) United States Patent
Haban

(10) Patent No.: US 11,597,342 B2
(45) Date of Patent: Mar. 7, 2023

(54) SYSTEMS AND METHODS FOR A MOVEABLE COVER PANEL OF AN AUTONOMOUS VEHICLE

(71) Applicant: UATC, LLC, San Francisco, CA (US)

(72) Inventor: Philipp Haban, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 197 days.

(21) Appl. No.: 16/918,178

(22) Filed: Jul. 1, 2020

(65) Prior Publication Data

US 2021/0387644 A1 Dec. 16, 2021

Related U.S. Application Data

(60) Provisional application No. 63/039,522, filed on Jun. 16, 2020.

(51) Int. Cl.
| | | |
|---|---|---|
| B60W 60/00 | (2020.01) | |
| B60R 21/205 | (2011.01) | |
| B62D 1/183 | (2006.01) | |

(52) U.S. Cl.
CPC ....... B60R 21/205 (2013.01); B60W 60/0016 (2020.02); B60W 2510/20 (2013.01); B62D 1/183 (2013.01)

(58) Field of Classification Search
CPC combination set(s) only.
See application file for complete search history.

(56) References Cited

U.S. PATENT DOCUMENTS

| | | | | |
|---|---|---|---|---|
| 2015/0137492 A1* | 5/2015 | Rao | ................... | B60R 21/01554 280/732 |
| 2016/0347348 A1* | 12/2016 | Lubischer | ............ | G05D 1/0088 |
| 2017/0225570 A1* | 8/2017 | El Aile | ..................... | B60R 7/06 |

(Continued)

FOREIGN PATENT DOCUMENTS

| | | | |
|---|---|---|---|
| DE | 102018001991 A1 | * | 9/2018 |
| DE | 102017010332 | | 5/2019 |

(Continued)

OTHER PUBLICATIONS

International Search Report and Written Opinion for Application No. PCT/US2021/037440, dated Aug. 31, 2021, 11 pages.

*Primary Examiner* — Anne Marie Antonucci
*Assistant Examiner* — Amelia Vorce
(74) *Attorney, Agent, or Firm* — Dority & Manning, P.A.

(57) ABSTRACT

Systems and methods for a moveable cover panel of an autonomous vehicle is provided. A vehicle can include a front panel disposed proximate to the front end of the passenger compartment, a vehicle motion control device located at the front panel, and a cover panel located at the front panel. The cover panel moveable relative to the front panel between an isolating position and an exposing position. The cover panel can isolate the vehicle motion control device from the passenger compartment when in the isolating position and expose the vehicle motion control device to the passenger compartment when in the exposing position. A method can include obtaining vehicle data identifying an operational mode, state, and/or status of the vehicle, determining a first position of the cover panel, and initiating a positional change for the cover panel based on the vehicle data and the first position.

20 Claims, 15 Drawing Sheets

(56) References Cited

U.S. PATENT DOCUMENTS

| | | | |
|---|---|---|---|
| 2019/0381962 A1* | 12/2019 | Sheldon | B60R 21/214 |
| 2021/0170980 A1* | 6/2021 | An | B60W 30/08 |
| 2021/0171086 A1* | 6/2021 | Kurokawa | B62D 1/183 |
| 2021/0197752 A1* | 7/2021 | Williams | B60R 21/205 |

FOREIGN PATENT DOCUMENTS

| | | |
|---|---|---|
| FR | 2861657 | 5/2005 |
| FR | 3064239 | 9/2018 |

\* cited by examiner

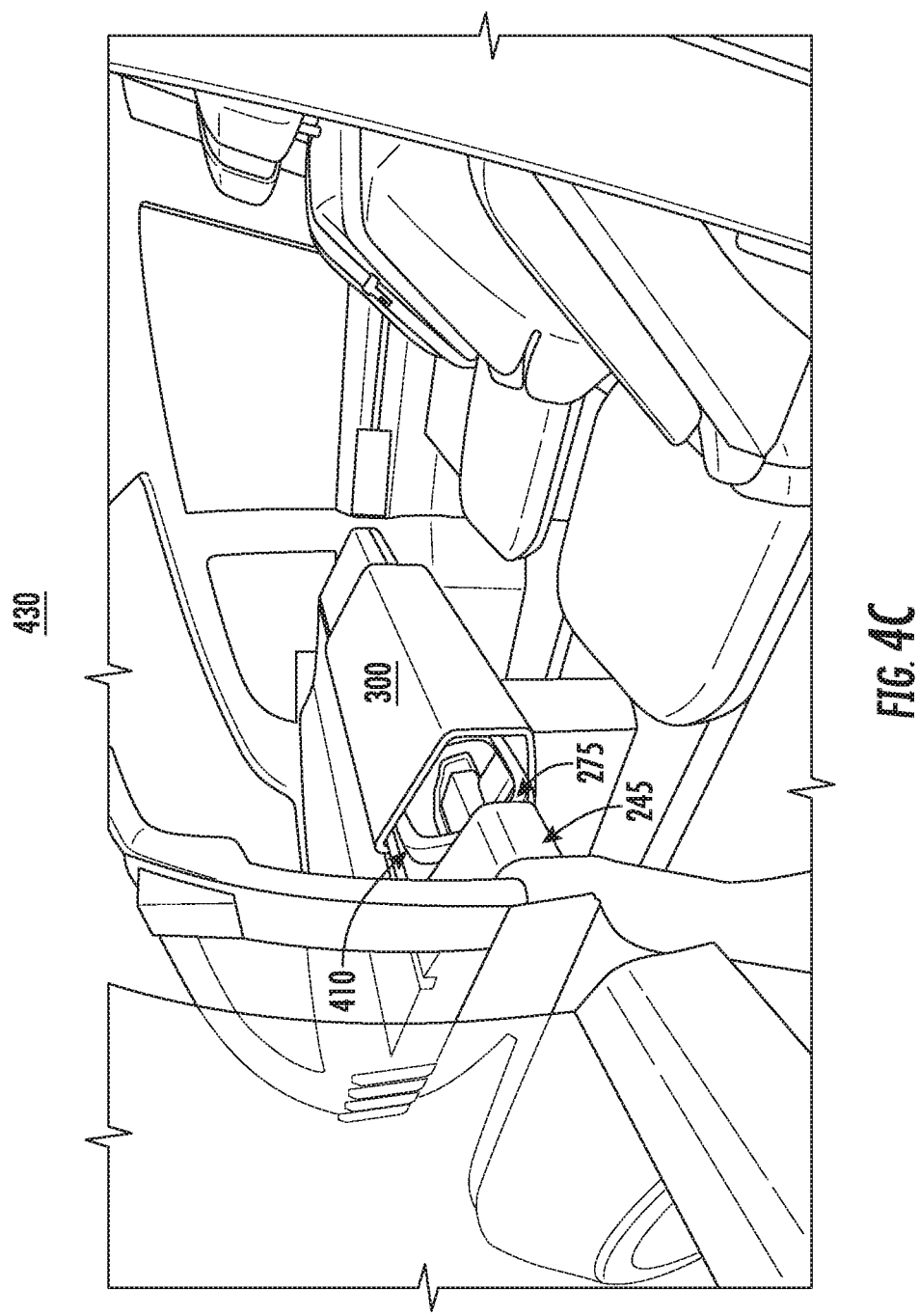

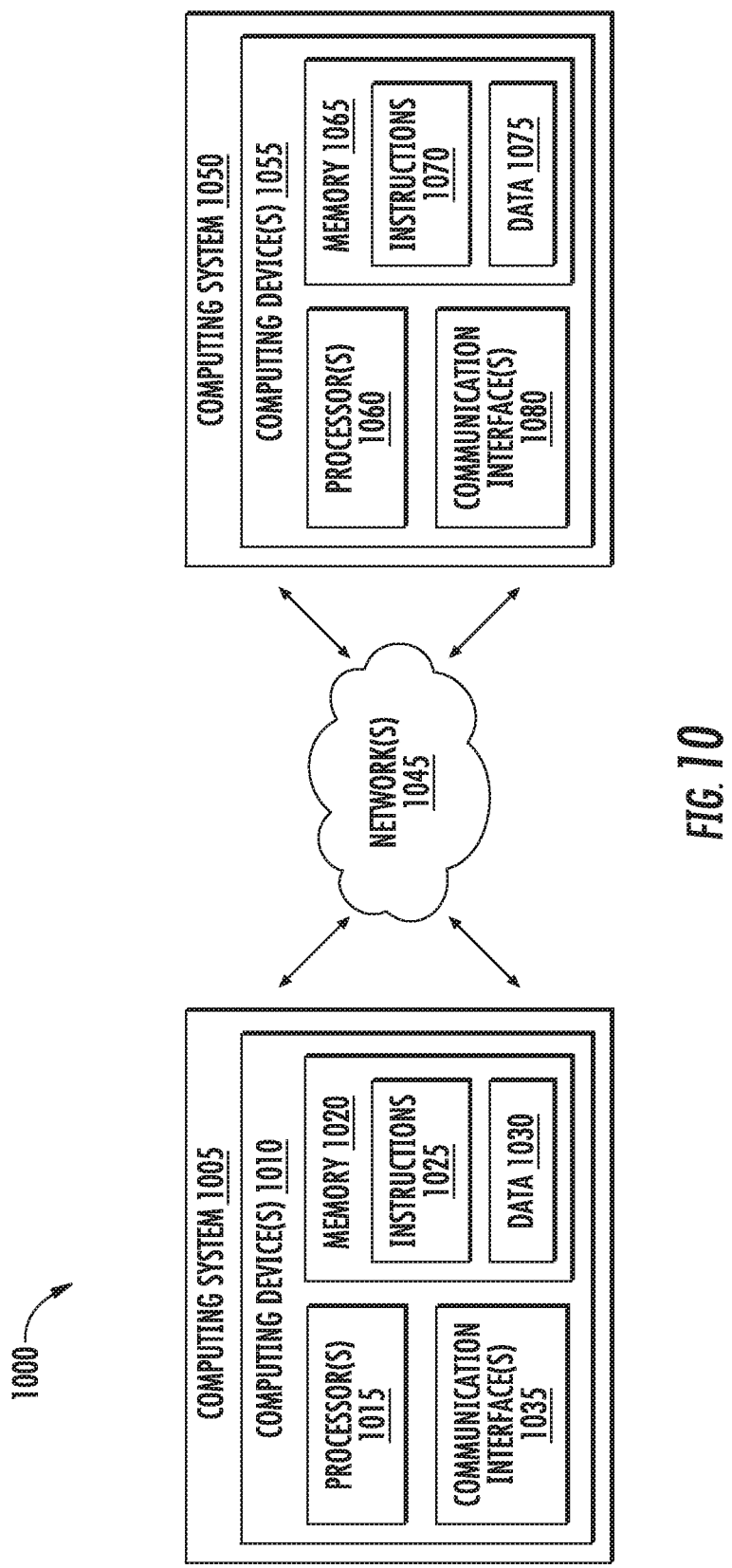

SYSTEMS AND METHODS FOR A MOVEABLE COVER PANEL OF AN AUTONOMOUS VEHICLE

RELATED APPLICATION

The present application is based on and claims benefit of U.S. Provisional Patent Application No. 63/039,522 having a filing date of Jun. 16, 2020, which is incorporated by reference herein.

FIELD

The present disclosure relates generally to autonomous vehicles and, more particularly, a moveable cover panel for autonomous vehicles and autonomous vehicle operating mode control.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

An example aspect of the present disclosure is directed to an autonomous vehicle. The autonomous vehicle can include a passenger compartment defining a longitudinal direction, a lateral direction, and a vertical direction. The passenger compartment can have a forward end and a rear end spaced apart from the forward end along the longitudinal direction. The passenger compartment can include a front panel disposed proximate to the front end of the passenger compartment, a vehicle motion control device located at the front panel, and a cover panel located at the front panel. The cover panel can be moveable relative to the front panel between an isolating position and an exposing position. The cover panel can isolate the vehicle motion control device from the passenger compartment when in the isolating position.

Another example aspect of the present disclosure is directed to a computer-implemented method of adjusting a position of a cover panel for an autonomous vehicle. The method includes obtaining, by a vehicle computing system including one or more computing devices, vehicle data indicative of an operating mode for the autonomous vehicle. The method includes determining, by the vehicle computing system, a first position of the cover panel for the autonomous vehicle. The cover panel is moveable along a front panel of the autonomous vehicle to isolate and expose a motion control device of the autonomous vehicle. The method can include initiating, by the vehicle computing device, a positional change for the cover panel based, at least in part, on the vehicle data and the first position.

Yet another example aspect of the present disclosure is directed to a computing system. The computing system can include one or more processors and one or more non-transitory computer-readable media that collectively store instructions that, when executed by the one or more processors, cause the system to perform operations. The operations can include obtaining vehicle data indicative of an operating mode of an autonomous vehicle. The operations can include determining a first position of a cover panel for the autonomous vehicle from among a plurality of positions. The plurality of positions can include an isolating position in which the cover panel substantially isolates a motion control device of the autonomous vehicle from a passenger compartment of the autonomous vehicle and an exposing position in which the motion control device is exposed to the passenger compartment of the autonomous vehicle. And, the operations can include initiating a positional change for the cover panel based, at least in part, on the vehicle data and the first position.

Other example aspects of the present disclosure are directed to other systems, methods, vehicles, apparatuses, tangible non-transitory computer-readable media, and devices for the operation of a device including a vehicle and/or one or more components thereof.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIGS. 4A-4D depict an example cover panel configuration according to example embodiments of the present disclosure;

FIG. 10 depicts a block diagram of example computing hardware according to example embodiments of the present disclosure.

DETAILED DESCRIPTION

Figure 1:
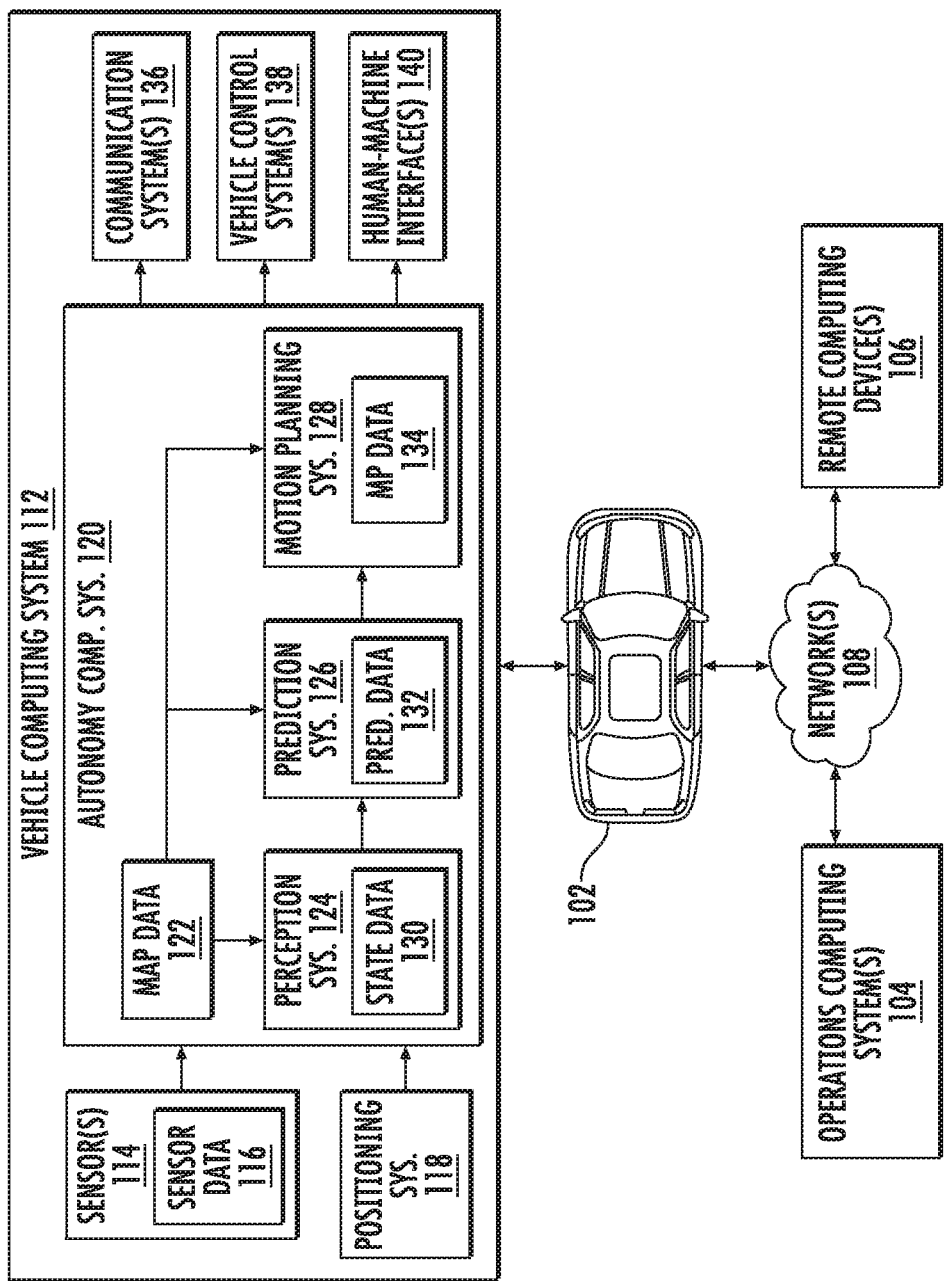
FIG. 1 depicts a block diagram of an example system for controlling the computational functions of an autonomous vehicle according to example embodiments of the present disclosure.

Aspects of the present disclosure are directed to improved systems and methods for facilitating the selective operation of an autonomous vehicle. In particular, aspects of the present disclosure are directed to an autonomous vehicle dashboard with a movable cover panel that can help improve the ability of an autonomous vehicle to safely change between operating modes/states. An autonomous vehicle, for example, can be configured to operate in one or more operating modes, each associated with a different autonomy state (e.g., manual mode/state, semi-autonomous mode/state, fully autonomous mode/state, etc.). The vehicle can include a front panel within a passenger compartment with one or more devices configured to control one or more aspects of the vehicle. For example, the front panel can include a number of manual touch inputs (e.g., steering wheels, operational buttons (e.g., to start/stop the vehicle, to change an autonomy mode of the vehicle), climate control devices, entertainment devices (e.g., audio devices, etc.), windshield devices, etc.) configured to control one or more aspects of the vehicle (e.g., steering, operation, entertainment, maintenance, etc.). As an example, the front panel can include a steering device that can be manually moved by a passenger of the vehicle to steer the vehicle while in a manual and/or semi-autonomous operating mode. Such devices, however, can become redundant and, in some cases, potentially hazardous while the vehicle operates in a fully autonomous operating mode.

To ensure passenger safety, an autonomous vehicle can include a cover panel located at the front panel. The cover panel can be moveable between one or more positions (e.g., an isolating position and an exposing position) relative to the front panel. At an isolating position, the cover panel can isolate one or more vehicle control device(s) of the front panel from the passenger compartment of the autonomous vehicle. This can include, for example, substantially covering the control device such that it cannot be physically contacted or seen by a passenger. At an exposing position, the cover panel can expose one or more of the vehicle control device(s) to the passenger compartment. This can allow a passenger to physically contact and/or see the control device. As described herein, a computing system (e.g., a vehicle computing system, operations computing system, etc.), can identify a current position of the cover panel, obtain vehicle data indicative of an operating mode of the autonomous vehicle, and initiate a positional change of the cover panel based on the operating mode of the autonomous vehicle and the current position of the cover panel. For instance, the computing system can determine that a desired position for the configurable cover panel is the isolating position in the event that the autonomous vehicle is in a fully autonomous operating mode (e.g., to isolate control device(s) from interfering with one or more passengers of the vehicle, etc.). In such a case, the computing system can initiate a positional change of the cover panel from a current exposing position to the desired isolating position. In this manner, the computing system can provide and/or deny access to control devices of an autonomous vehicle depending on the operating mode of the vehicle.

The autonomous vehicle can include one or more airbags within the passenger compartment. The airbag(s) can include a first airbag in the front panel (e.g., positioned in front of a front passenger seat), a second airbag in a control device (e.g., a steering device such as a steering wheel), and/or a third airbag in the cover panel. Each airbag can be activated and/or deactivated according to the position of the cover panel. For instance, a computing system (e.g., vehicle computing system, operations computing system, etc.) can activate the first and third airbag and deactivate the second airbag in the event that the cover panel is in the isolating position (e.g., covering the control device). The second airbag can be deactivated, for example, because the control device including the second airbag can be covered by the cover panel in the isolating position. As such, the airbag in the cover panel can be available for a passenger riding in the front "operator" seat of the vehicle. Similarly, when in the exposed position, the first airbag in the front panel can be deactivate and the third airbag in the cover panel can be activated and available for a passenger in the front passenger seat of the vehicle. In this manner, the systems and methods of the present disclosure can ensure safety by dynamically activating airbags based on the position of a movable cover panel to reduce potential airbag interference by the configurable system. In this way, the computing system can provide manual touch points to allow for passenger control of a vehicle without sacrificing the safety and comfort of passengers during autonomous travel.

The following describes the technology of this disclosure within the context of autonomous vehicles for example purposes only. As described herein, the technology described herein is not limited to autonomous vehicles and can be implemented within other robotic and computing systems, such as those utilized by a ridesharing and/or delivery services.

An autonomous vehicle can be a ground-based vehicle, aerial vehicle, and/or another type of vehicle. The autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.). The service platform can allow an autonomous vehicle to obtain data from and/or communicate data to the operations computing system. By way of example, a user can provide (e.g., via a user device) a request for a vehicle service to the operations computing system associated with the service entity.

The autonomous vehicle can include a computing system (e.g., a vehicle computing system) with a variety of components for operating with minimal and/or no interaction from a human operator. For example, the computing system can be located onboard the autonomous vehicle and include one or more sensors (e.g., cameras, Light Detection and Ranging (LiDAR), Radio Detection and Ranging (RADAR), etc.), an autonomy computing system (e.g., for determining autonomous navigation), one or more vehicle control systems (e.g., for controlling braking, steering, powertrain), etc. The autonomy computing system can include a number of sub-systems that cooperate to perceive the surrounding environment of the autonomous vehicle and determine a motion plan for controlling the motion of the autonomous vehicle.

For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle. For example, the motion planning system can determine a motion plan in accordance with a determined route and/or one or more objects along the route. In some implementations, one or more of the number of sub-systems can be combined into one system. For example, an autonomy computing system can include a perception/prediction system configured to perceive and predict a motion of one or more objects within the surrounding environment of the autonomous vehicle.

The vehicle computing system can include and/or be associated with a plurality of external sensors (e.g., LiDAR sensors, outward facing cameras, etc.) and/or interior sensors (e.g., internal facing cameras/heat sensors, internal facing microphones, tactile sensors (e.g., touch sensors within seats of a vehicle interior, on the handle of a vehicle door, etc.), etc.). The plurality of sensors can be placed throughout the vehicle to obtain sensor data indicative of the presence of objects and/or humans currently and/or predicted to be within and/or proximate to the vehicle's interior. The sensor data, for example, can be obtained by the interior sensors such as one or more cameras configured to obtain image data, one or more microphones configured to obtain auditory data, one or more tactile sensors configured to obtain tactile data (e.g., to detect a touch to a seat to determine whether an object and/or passenger is placed on or sitting in a passenger seat, etc.). In some implementations, the sensor data can identify the location and one or more other characteristics (e.g., age, height, weight, etc.) of one or more passengers within the vehicle interior.

The vehicle computing system can store and/or otherwise access vehicle data associated with the autonomous vehicle. The vehicle data, for example, can include operational data associated with an operating mode of the vehicle and/or operational states for one or more components of the vehicle. As an example, the vehicle data can be indicative of an operating mode (e.g., vehicle autonomy mode) and/or an operational status mode (e.g., ridesharing, etc.) for the autonomous vehicle. In this regard, the autonomous vehicle can be configured to operate in one or more operating modes including, for example, a fully autonomous operating mode, a semi-autonomous operating mode, a manual operating mode, a park mode, a sleep mode, and/or any other mode describing the operational capabilities of the vehicle. A fully autonomous (e.g., self-driving) operating mode can be one in which the vehicle can provide driving and navigational operation with minimal and/or no interaction from a human driver present in the vehicle. A semi-autonomous operating mode can be one in which the vehicle can operate with some interaction from a human driver present in the vehicle. Park and/or sleep modes can be used between operating modes while the vehicle performs various actions including waiting to provide a subsequent vehicle service, recharging between operating modes, etc. And, a manual operating mode can be one in which the vehicle can drive, navigate, etc. based on manual inputs from a human driver. The manual inputs, for example, can be provided via one or more manual touchpoints within the vehicle as described in greater detail herein.

In addition, the autonomous vehicle can be configured to operate in one or more operational status modes including, for example, a public-facing mode (e.g., ridesharing mode), a maintenance mode (e.g., where authorized personnel are authorized to access the vehicle), a private-facing mode, and/or any other mode describing the authorization capability of the vehicle. By way of example, a public-facing mode can be one in which the vehicle can be authorized to service a transportation service request (e.g., a ride-sharing request, etc.). The maintenance mode can be one in which the vehicle can be authorized to receive maintenance (e.g., from one or more authorized maintenance service providers, etc.). The private-facing mode can be one in which the vehicle can be authorized for private use by a vehicle operator (e.g., via one or more manual inputs to one or more manual touchpoint while in a manual operation mode, etc.) and/or where the vehicle performs a task for the service entity like vehicle-assistance, data collection, etc. As an example, an instruction to change the operational status mode can be received from an authorized user (e.g., via a user device of a maintenance provider, via user input of the maintenance provider to an onboard user device, etc.), an operations computing system (e.g., service entity system, etc.), etc. to, for example, authorize the vehicle for manual control (e.g., to tow the vehicle, test one or more vehicle components, etc.), authorized the vehicle for full autonomous control (e.g., to provide an autonomous ride-sharing service, etc.).

The vehicle data can identify the current operating mode (and/or a current operational-status mode) of the vehicle and/or one or more operating modes (and/or operational-status modes) preceding and/or subsequent to the current vehicle operating mode (and/or current operational-status mode). For example, in some implementations, the vehicle data can identify an anticipated operating mode. The anticipated operating mode can include a predicted operating mode at a future point in time (e.g., one or more seconds, minutes, etc. subsequent to the current time). The vehicle computing system can determine an anticipated operating mode, for example, based on one or more operational constraints of the autonomous vehicle, rider preferences associated with a passenger of the autonomous vehicle, map data indicative of the surrounding environment of the autonomous vehicle, a vehicle route, and/or any other data associated with the operation of the vehicle.

In some implementations, the vehicle data can include activation data associated with the operational state of one or more components of the vehicle. As an example, the vehicle can include a plurality of airbags (e.g., a first, second, and third airbag, etc.) placed throughout the vehicle's interior (e.g., a passenger compartment of the vehicle). In such a case, the activation data can include an airbag activation state for one or more of the airbags located within the vehicle interior (e.g., passenger compartment). For instance, each of the plurality airbags can be associated with a respective airbag activation state. Each airbag can be associated with an activated state and/or a deactivated state. The activated state can indicate that the airbag is ON and can be deployed in the event a triggering condition exists (e.g., an indication of an impact with another object, etc.). The deactivated state can indicate that the airbag is OFF and will not and/or cannot be deployed in the event a triggering condition exists. As discussed in further detail herein, an airbag can be deactivated in the event that it is covered by another airbag (e.g., and thus redundant or potentially hazardous if deployed) and/or based on sensor data indicative of an at-risk passenger (e.g., a passenger that achieves a height, age, weight, threshold, etc.).

The autonomous vehicle can include a passenger compartment defining a longitudinal direction, a lateral direction, and a vertical direction. The passenger compartment can include one or more vehicle seats to support one or more passengers of the vehicle and/or one or more vehicle doors to enable the one or more passengers to enter and/or exit the vehicle interior (e.g., passenger compartment). For instance, the passenger compartment can include a floorboard with one or more mechanical components (e.g., sliding tracks, spring loaded levers, locking pins, and/or other locking mechanisms, etc.) placed therein configured to couple one or more mechanical components (e.g., sliding skids, wheels, spring loaded levers, locking pins, and/or other attachment mechanisms, etc.) of the vehicle seats to the floor of the passenger compartment.

The passenger compartment can have a forward end and a rear end spaced apart from the forward end along the longitudinal direction. The passenger compartment can include a front panel disposed proximate to the front end of the passenger compartment (e.g., more towards the front end than the rear end), one or more vehicle control device(s) located at the front panel, and/or a moveable cover panel located at the front panel. For example, the front panel can be located at a front windshield of the autonomous vehicle. The vehicle control device(s), for example, can extend through, attach to, be affixed to, couple to, extend over, etc. the front panel of the vehicle and/or one or more components and/or portions of the front panel. The vehicle control device(s) can include one or more manual touch points with which a passenger can interact to control one or more aspects (e.g., steering, entertainment, maintenance, etc.) of the autonomous vehicle. The manual touch points, for example, can include one or more steering devices, climate control devices, entertainment devices, signaling devices (e.g., to activate one or more turning signals, etc.), windshield devices (e.g., to activate windshield wipers, cleaning fluid, etc.), etc.

As an example, the vehicle control device(s) can include a vehicle motion control device. For instance, the vehicle motion control device can include a steering device configured to steer the autonomous vehicle. The steering device can include, for example, a steering wheel, joystick, and/or other type of form factor. The steering device, for example, can be manually and/or autonomously moved (e.g., twisted, turned, etc.) to navigate and/or steer the autonomous vehicle. In some implementations, the vehicle control device(s) can be disposed within the front panel, extend through/over/under etc. the front panel, be connected to the front panel, etc. By way of example, the front panel can include a receding portion and a steering device can be coupled to the receding portion of the front panel by a telescopic actuator configured to recede within the receding portion of the front panel. In addition, or alternatively, the front panel can include one or more touch interfaces, interactive buttons, and/or one or more other control devices disposed therein to manually control one or more other aspects of the autonomous vehicle.

The cover panel located at the front panel can be configured to isolate and/or expose one or more of the control device(s). For example, as described herein, the cover panel can extend through, attach to, couple to, extend over/under, etc. the front panel of the vehicle and/or one or more components and/or portions of the front panel. The cover panel can be configured to isolate one or more of the control device(s) from the passenger compartment and/or one or more passengers within the passenger compartment by covering the control device(s).

More particularly, the cover panel can be moveable (e.g., slidable, rollable, etc.) relative to the front panel between an isolating position and an exposing position. The cover panel can isolate (e.g., cover, separate, detach, exclude, etc.) one or more of the vehicle control device(s) from the passenger compartment when in the isolating position. For example, the cover panel can be configured to substantially, partially, and/or completely cover one or more of the control device(s) of the autonomous vehicle such that the cover panel can prevent a user from physically manipulating/contacting and/or seeing the control device(s) when the cover panel is positioned at the isolating position. In this manner, the cover panel can be configured to isolate one or more of the vehicle control device(s) from one or more passengers (e.g., from inferring with the one or more passengers, etc.) within the passenger compartment.

The cover panel can be moved away from one or more of the control device(s) when the cover panel is in the exposing position. For example, the control device(s) can be exposed to the passenger compartment of the vehicle such that a user can physically contact/manipulate and/or see the control device(s) when the cover panel is in the exposing position. In this manner, a vehicle control device can be assessible by passenger(s) within the passenger compartment of the vehicle while the cover panel is in the exposing position.

In some implementations, the cover panel can include a sliding panel coupled to the front panel by one or more attachment mechanisms (e.g., tracks, rails, hinges, etc.). For instance, the front panel can include one or more mechanical components (e.g., sliding tracks, spring loaded levers, locking pins, and/or other locking mechanisms, etc.) placed therein configured to couple to one or more mechanical components (e.g., sliding skids, wheels, spring loaded levers, locking pins, and/or any the attachment mechanisms, etc.) of the cover panel. As an example, the front panel can include one or more tracks configured to couple to one or more sliding skids of the cover panel. In such a case, the cover panel can be affixed to the front panel by one or more compatible attachment mechanisms of the front panel (e.g., tracks, etc.) and the cover panel (e.g., sliding skids, etc.).

The cover panel can be configured to slide (e.g., via rollers, gliders, skids, etc.) along the one or more attachment mechanisms (e.g., tracks) to move between the isolating position and the exposing position (e.g., to isolate and/or provide access to the vehicle control device(s)). As an example, the one or more attachment mechanisms can be positioned along the lateral direction of the front panel (e.g., tracks in which wheels of the cover panel can fit). In such a case, the cover panel can be configured to slide laterally across the front panel to isolate (e.g., at the isolation position) and/or expose (e.g., at the exposing position) one or more of the control device(s). In addition, or alternatively, the one or more attachment mechanisms can be positioned along the vertical direction of the front panel. In such a case, the cover panel can be configured to slide vertically (and/or in part longitudinally) across the front panel to isolate (e.g., at the isolation position) and/or expose (e.g., at the exposing position) one or more of the control device(s). By way of example, the cover panel can include a roll top panel. The roll top panel can be configured to extend vertically and/or longitudinally along the front panel to isolate one or more of the control device(s) located at the front panel and retract vertically and/or longitudinally along the front panel to expose one or more of the control device(s) located at the front panel.

The cover panel can be configured to be manually and/or automatically moved between the isolating position and the exposing position. For instance, a vehicle operator, passenger, remote operator, etc. can interact with the cover panel and/or one or more components of the cover panel to manually and/or automatically slide the cover panel between the isolating position and the exposing position. By way of example, a vehicle operator and/or passenger can provide a force (e.g., push, pull, etc.) to the cover panel to move the cover panel between positions.

In addition, or alternatively, the cover panel can include and/or be associated with a triggering mechanism (e.g., one or more interactive buttons, switches, remote activation devices, etc.) that can initiate the automatic movement between the isolating position and the exposing position. For instance, the cover panel and/or the front panel can include a panel motor (e.g., direct current motor (e.g., permanent magnet DC motor, series DC motor, shunt DC motor, compound DC motor, etc.), alternating current motor (e.g., induction motor, synchronous motor, etc.), universal motor, etc.). The panel motor can be coupled to one or more of the mechanical component(s) of the cover panel and/or the front panel. The panel motor can be configured to receive (e.g., via a vehicle computing system, operations computing system, one or more triggering mechanisms associated with the cover panel, etc.) and implement instructions to move the cover panel between the isolating position and the exposing position in accordance with the implementations described herein.

In some implementations, the cover panel can be locked, fastened, etc. (e.g., via one or more locking pins, one or more manual lock and keys, combination locks, and/or any other locking device) at an isolating position and/or an exposing position. By way of example, the cover panel can be manually and/or automatically locked, fastened, etc. to a current position (e.g., isolating position, exposing position, etc.) such that the cover panel is prevented (at least in part) from being moved from the current position. In such a case, the cover panel can be manually and/or automatically unlocked before moving between the isolating and exposing positions. As an example, the cover panel can include and/or be associated with a locking state. The cover panel can be prevented from moving (e.g., locked at a current position) while the locking state is active and movable (e.g., unlocked at a current position) between the isolating position and the exposing position while the locking state is inactive. Authorized personnel (e.g., maintenance operator, etc.) can utilize a key, code, etc. to unlock the cover panel.

In some implementations, the front panel and/or one or more components located at the front panel can include one or more of a plurality of airbags. For instance, the front panel can include a first airbag, a vehicle control device can include a second airbag, and/or the cover panel can include a third airbag. The first airbag, for example, can be located within a portion of the front panel spaced apart from the vehicle control device in the lateral direction. By way of example, the vehicle control device can be located in front of a first passenger seat within the passenger compartment of the autonomous vehicle. In such a case, the first airbag can be located within the front panel in front of a second passenger seat within the passenger compartment of the autonomous vehicle. The first passenger seat can be spaced apart from the second passenger seat along the lateral direction of the passenger compartment. In this manner, the first airbag can be laterally opposite to the second airbag within a vehicle control device.

The airbags can be activated and/or deactivated based on the position of the cover panel. For example, at least one of the first airbag and/or the second airbag can be activated based, at least in part, on a position of the cover panel. An airbag activation state, for example, for the first airbag, the second airbag, and/or the third airbag can include an activated state or a deactivated state. As described herein, the activated state or the deactivated state can be indicative of an ON/OFF condition for a respective airbag.

In some implementations, one or more of the first, second, and/or third airbags can be activated and/or deactivated based on whether the airbag is covered by another airbag. For example, while in the isolating position, the third airbag of the cover panel can cover the second airbag of a control device. In addition, while in the exposing position, the third airbag of the cover panel can cover the first airbag of the front panel (e.g., positioned in front of a front passenger seat). In each case, the covered airbag (e.g., the first and/or second airbags, etc.) can be deactivated to prevent interference with the covering airbag (e.g., the third airbag). By way of example, the first airbag and the third airbag can be in the activated state and the second airbag can be in the deactivated state when the cover panel is in an isolating position. In addition, or alternatively, the second airbag and the third airbag can be in the activated state and the first airbag can be in the deactivated state when the cover panel is in an exposing position.

A computing system can initiate one or more cover panel and/or airbag actions based on one or more aspects of the vehicle's operation (e.g., vehicle operating mode, operational-status modes, etc.). For instance, the computing system can initiate a locking and/or unlocking action, a positional change, an airbag activation/deactivation, and/or any other action associated with the cover panel and/or the one or more airbags of the autonomous vehicle. As an example, the computing system can lock and/or unlock the cover panel and/or automatically reposition the cover panel (and/or activate/deactivate one or more airbags) based on an operating mode/state of the autonomous vehicle. For example, a computing system (e.g., a vehicle computing system, operations computing system, etc.) can obtain vehicle data indicative of a vehicle operating mode for the autonomous vehicle. In some implementations, the vehicle data can also include an airbag activation state for the first airbag, second airbag, and/or third airbag.

The computing system can determine a first position of the cover panel for the autonomous vehicle. The cover panel, for example, can be moveable (e.g., while unlocked) along the front panel of the autonomous vehicle to isolate and expose a motion control device of the autonomous vehicle. The computing system can initiate a locking action and/or a positional change for the cover panel based, at least in part, on the vehicle data and the first position. The computing system can also, or alternatively, initiate the locking action based, at least in part, on the operating mode of the autonomous vehicle. For example, the cover panel can be locked in the isolating position when the autonomous vehicle is in a fully autonomous mode and/or unlocked when the autonomous vehicle is in a manual mode.

The locking action can include a change to the locking state (e.g., active or inactive) associated with the cover panel and a corresponding action (e.g., locking the cover panel to the first position, unlocking the cover panel from the first position, etc.). The computing system can initiate the locking action by generating control instructions for implementing the locking action and providing the instructions to one or more locking mechanisms (e.g., locking pins, etc.) configured to receive and implement the instructions by locking and/or unlocking the cover panel at the first position. The positional change can include a change from an exposing position to an isolating position, and/or vice versa. The computing system can initiate a positional change by generating control instructions for implementing the positional change and providing the instructions to the panel motor configured to receive and implement the instructions by moving the cover panel in accordance with the positional change.

To initiate an action, the computing system can determine a desired position for the cover panel. The desired position can be determined based, at least in part, on the vehicle data. For example, the desired position for the cover panel can include the isolating position in the event that the vehicle operating mode is a fully autonomous operating mode. In this manner, one or more of the control device(s) can be covered and/or otherwise isolated from the passenger compartment when manual inputs to the control device(s) would interfere with the autonomous operation of the vehicle.

In addition, or alternatively, the desired position for the cover panel can be the exposing position in the event that the vehicle operating mode includes the manual operating mode and/or the semi-autonomous operating mode. In this manner, one or more of the control device(s) can be uncovered and/or otherwise accessible from the passenger compartment (e.g., to one or more passengers within the passenger compartment) to enable one or more manual inputs to the control device(s) to control one or more operations of the autonomous vehicle.

In some implementations, the computing system can determine an anticipated desired position for the cover panel. For example, the computing system can determine (e.g., predict, anticipate, etc.) that an operating mode change will occur at a future time (e.g., one or more seconds, minutes, etc. subsequent to a current time) based on the vehicle data. This can include, for example, anticipating that the autonomous vehicle will change from a fully autonomous mode into a semi-autonomous or manual operating mode based on an upcoming route segment (e.g., that is unmapped for the autonomous vehicle) and/or scenario (e.g., a crowded urban environment nearby a drop-off location). In such a case, the computing system can determine an anticipated desired position for the cover panel based on the anticipated operating mode change.

In addition, or alternatively, the computing system can determine the current operating mode and/or a preceding operation mode of the autonomous vehicle based at least in part on the first position of the cover panel. By way of example, the computing system can determine that the autonomous vehicle is currently and/or was previously operating in a manual and/or semi-autonomous operating mode in the event that the first position of the cover panel is the exposing position. In addition, the computing system can determine that the autonomous vehicle is currently and/or was previously operating in a fully autonomous operating mode in the event that the first position of the cover panel is the isolating position.

In some implementations, the computing system can obtain a current locking state for the cover panel. The current locking state can identify whether the cover panel is locked and/or unlocked to the first position. In the event that the first position is the same as the desired position, the computing system can ensure that the current locking state is active (e.g., the cover panel is locked to the first position). For instance, the computing system can initiate a locking action to lock the cover panel to the first position in the event that the current locking state is inactive (e.g., the cover panel is unlocked). In this manner, the cover panel can be securely fastened to the exposing position (and/or an isolating position) if it is determined that the vehicle is operating in a manual mode (and/or an autonomous mode) to prevent the cover panel from interfering (e.g., by sliding and/or otherwise moving to along the front panel) with an operator of the vehicle.

In addition, or alternatively, the computing system can ensure that the current locking state is inactive if the first position is different than the desired position and/or anticipated desired position. For instance, the computing system can initiate a locking action to unlock the cover panel from the first position in the event that the current locking state is active. In this manner, the cover panel can be unlocked from the first position to enable a passenger or operator of the vehicle to manually move the cover panel. In addition, or alternatively, the cover panel can be unlocked from the first position to enable the computing system to initiate a positional change of the cover panel.

By way of example, the computing system can determine that the first position is different than the desired position and/or the anticipated desired position. For instance, the first position can include the exposing position and a vehicle data can indicate that the autonomous vehicle is in a fully autonomous operating mode at the current time and/or be predicted to be in the fully autonomous operating mode at a future time. In such a case, the computing system can determine that the desired and/or anticipated desired position of the cover panel is the isolating position and that the desired (and/or anticipated desired) isolating position is different from the current exposing position. In addition, or alternatively, the first position can include the isolating position and the vehicle data can indicate the vehicle is in the manual operating mode at the current time and/or be predicted to be in the manual operating mode at a future time. In such a case, the computing system can determine that the desired (and/or anticipated desired) position of the cover panel is the exposing position and the desired (and/or anticipated desired) exposing position is different from the current isolating position.

In response, the computing system can initiate the positional change of the cover panel from the first position to the desired position at the current time, an anticipated future time, and/or any time therebetween. For example, the computing system can initiate the positional change of the cover panel based on the desired (and/or anticipated desired) position. For instance, the computing system can initiate the positional change of the cover panel from an isolating position to an exposing position at a current time and/or before a predicted mode change from a fully autonomous operating mode to a manual operating mode. In this manner, one or more control devices of the autonomous vehicle can be made available and/or exposed to the passenger compartment before they can be used to operate the vehicle. As another example, the computing system can initiate the positional change of the cover panel from an exposing position to an isolating position at a current time and/or after a predicted mode change from a manual operating mode to a fully autonomous operating mode. In this manner, the one or more control devices of the autonomous vehicle can be isolated from the passenger compartment after they can no longer be used to operate the vehicle.

In some implementations, the computing system can initiate one or more safety actions based on the positional change of the cover panel. By way of example, the computing system can determine one or more safety actions to prepare for the positional change of the cover panel. The one or more safety actions, for example, can include one or more motion control planning actions (e.g., a parking action to park the vehicle before initiating the positional change of the cover panel), one or more operating mode actions (e.g., to change the operating mode of the autonomous vehicle), one or more operational-status actions (e.g., to change the operational-status of the autonomous vehicle), one or more airbag activation actions (e.g., to change the activation state of one or more airbags of the autonomous vehicle), and/or any other action to ensure the safe transition of the cover panel between an isolating position and an exposing position. As an example, the computing system can generate one or more control instructions (e.g., a first set of instructions) to control the autonomous vehicle to prepare for a change in the operating mode of the vehicle by parking at a safe location, securing the vehicle, determining whether passengers are in the vehicle, etc. The computing system can generate one or more control instructions (e.g., a second set of instructions) to initiate the positional change of the cover panel after the autonomous vehicle is prepared for the change in the operating mode of the vehicle.

As another example, the computing system can determine one or more airbag activation actions based on a positional change of the cover panel. For instance, the computing system can determine a desired airbag activation state in a similar manner. The computing system can initiate an airbag activation state change for each of the airbags based, at least in part, on the positional change (and/or an anticipated positional change) for the cover panel. For instance, as described herein, the desired activation state for the first airbag and the third airbag can be the activated state and the desired activation state for the second airbag can be the deactivated state when the motion control device of the autonomous vehicle is isolated by the cover panel. Moreover, the desired activation state for the second airbag and the third airbag can be the activated state and the desired activation state for the first airbag can be the deactivated state when the motion control device of the autonomous vehicle is exposed by the cover panel. Thus, in the event that a positional change is from an isolating position to an exposing position, the computing system can activate the second airbag and deactivate the first airbag, and/or vice versa.

The systems and methods described herein provide a number of technical effects and benefits. For instance, by repositioning a covering panel within a passenger compartment of an autonomous vehicle based on the vehicle's operating mode, the computing system described herein can safely and effectively facilitate the autonomous navigation of a vehicle by preventing interference to manual control devices of the vehicle. This can improve autonomous vehicle operations by selectively isolating and/or exposing control elements of a vehicle based on the vehicle's operational state and, consequently, the need for the control elements. In this manner, the systems and methods described herein can improve safety by ensuring that the control elements of an autonomous vehicle do not interfere with passengers within the vehicle during autonomous navigation. This, in turn, can proactively prevent potentially harmful passenger interference with the navigation of the vehicle. Moreover, by isolating the control elements from the passenger compartment, the systems and methods described herein can reduce the need for decoupling control elements of the vehicle (e.g., decoupling a steering wheel during autonomous operations to prevent passenger interfere). This can reduce the processing and analysis needed for autonomous navigation while also reducing the potential stress, wear, and tear on a vehicle's hardware components that can be caused by interference to control elements of the vehicle during autonomous operations.

Example aspects of the present disclosure can provide a number of improvements to computing technology such as, for example, autonomous vehicle computing technology. For instance, the systems and methods of the present disclosure can provide an improved approach for facilitating the autonomous operation of a vehicle by isolating control devices of the vehicle from a passenger compartment. For example, a computing system can obtain vehicle data indicative of a vehicle operating mode for the autonomous vehicle. The computing system can determine a first position of a cover panel for the autonomous vehicle. The cover panel, for example, can be moveable along a front panel of the autonomous vehicle to isolate and expose a motion control device of the autonomous vehicle. The computing system can initiate a positional change for the cover panel based, at least in part, on the vehicle data and the first position.

In this manner, the computing system can employ improved techniques (e.g., for moving a moveable cover panel) to reduce interference with passengers of a ridesharing system. To this end, the computing system can accumulate and utilize newly available information such as, for example, vehicle data descriptive of a current and/or anticipated vehicle operating mode, and/or positional data descriptive of a current and/or desired position of a moveable cover panel. In this way, the computing system provides a practical application that enables the safe and efficient autonomous navigation of vehicles, while reducing interference between control components of a vehicle and passengers within the vehicle.

Various means can be configured to perform the methods and processes described herein. For example, a computing system can include data obtaining unit(s), positional unit(s), desired unit(s), initiation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain vehicle data indicative of a vehicle operating mode for an autonomous vehicle. The means (e.g., positional unit(s), etc.) can be configured to determine a first position of a cover panel for the autonomous vehicle. The cover panel, for example, can be moveable along a front panel of the autonomous vehicle to isolate and/or expose a motion control device of the autonomous vehicle. The means (e.g., desired unit(s), etc.) can be configured to determine a desired position for cover panel based, at least in part, on the vehicle data. The means (e.g., initiation unit(s), etc.) can be configured to initiate a positional change for the cover panel based, at least in part, on the vehicle data and the first position. In addition, the means (e.g., initiation unit(s), etc.) can be configured to determine that the first position is different than the desired position and, in response, initiate the positional change of the cover panel from the first position to the desired position.

With reference now to FIGS. 1-15, example embodiments of the present disclosure will be discussed in further detail. FIG. 1 depicts a block diagram of an example system 100 for controlling the navigation of a vehicle according to example embodiments of the present disclosure. As illustrated, FIG. 1 shows an example system 100 that can include an autonomous vehicle 102, an operations computing system 104, one or more remote computing devices 106, a communication network 108, a vehicle computing system 112, one or more sensors 114, sensor data 116, a positioning system 118, an autonomy computing system 120, map data 122, a perception system 124, a prediction system 126, a motion planning system 128, state data 130, prediction data 132, motion plan data 134, a communication system 136, a vehicle control system 138, and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the autonomous vehicle 102. As an example, the operations computing system 104 can be associated with a service entity (e.g., one or more service provider(s)) associated with the provision of one or more vehicle services. The service entity can be an individual, a group of individuals, a company (e.g., a business entity, organization, etc.), a group of entities (e.g., affiliated companies), and/or another type of entity that offers and/or coordinates the provision of vehicle service(s) to one or more users. For instance, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

The operations computing system 104 can include multiple components for performing various operations and functions. For example, the operations computing system 104 can include and/or otherwise be associated with the one or more computing devices that are remote from the autonomous vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with the operation of one or more vehicles (e.g., a fleet of vehicles), with the provision of vehicle services, and/or other operations as discussed herein.

For example, the operations computing system 104 can be configured to monitor and communicate with the autonomous vehicle 102 and/or its users to coordinate a vehicle service provided by the autonomous vehicle 102. To do so, the operations computing system 104 can manage a database that stores data including vehicle status data associated with the status of vehicles including autonomous vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the state of objects internal and/or external to a vehicle (e.g., the physical dimensions and/or appearance of objects internal/external to the vehicle), one or more operational modes of the vehicle, etc.

For instance, the operations computing system 104 can include a service platform. The service platform can include a plurality of back-end services and front-end interfaces, which are accessible via one or more APIs. For example, the autonomous vehicle 102 and/or another computing system that is remote from the autonomous vehicle 102 can communicate/access the service platform (and its backend services) by calling the one or more APIs. Such components can facilitate secure, bidirectional communications between autonomous vehicles and/or the service entity's operations system (e.g., including a data center, etc.). The service platform can allow an autonomous vehicle to obtain data from and/or communicate data to the operations computing system 104. By way of example, a user can provide (e.g., via a user device) a request for a vehicle service to the operations computing system 104 associated with the service entity.

The operations computing system 104 can communicate with the one or more remote computing devices 106 and/or the autonomous vehicle 102 via one or more communications networks including the communications network 108.

The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the autonomous vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the autonomous vehicle 102 including exchanging (e.g., sending and/or receiving) data or signals with the autonomous vehicle 102, monitoring the state of the autonomous vehicle 102, and/or controlling the autonomous vehicle 102. The one or more remote computing devices 106 can communicate (e.g., exchange data and/or signals) with one or more devices including the operations computing system 104 and the autonomous vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the autonomous vehicle 102 including a location (e.g., latitude and longitude), a velocity, acceleration, a trajectory, and/or a path of the autonomous vehicle 102 based in part on signals or data exchanged with the autonomous vehicle 102. In some implementations, the operations computing system 104 can include the one or more remote computing devices 106.

The autonomous vehicle 102 can be a ground-based vehicle (e.g., an automobile, bike, scooter, other light electric vehicle, etc.), an aerial vehicle (e.g., aircraft, vertical take-off and landing vehicle), and/or another type of vehicle. The autonomous vehicle 102 can perform various actions including driving, navigating, and/or operating, with minimal and/or no interaction from a human driver. The autonomous vehicle 102 can be configured to operate in one or more operating modes including, for example, a fully autonomous operating mode, a semi-autonomous operating mode, a manual operating mode, a park mode, a sleep mode, and/or any other mode describing the operational capabilities of the vehicle 102. A fully autonomous (e.g., self-driving) operating mode can be one in which the vehicle 102 can provide driving and navigational operation with minimal and/or no interaction from a human driver present in the vehicle 102. A semi-autonomous operating mode can be one in which the vehicle 102 can operate with some interaction from a human driver present in the vehicle. Park and/or sleep modes can be used between operating modes while the vehicle performs various actions including waiting to provide a subsequent vehicle service, recharging between operating modes, etc. And, a manual operating mode can be one in which the vehicle 102 can drive, navigate, etc. based on manual inputs from a human driver. The manual inputs, for example, can be provided via one or more manual touchpoints within the vehicle as described in greater detail herein.

In addition, the autonomous vehicle 102 can be configured to operate in one or more operational status modes including, for example, a public-facing mode (e.g., ridesharing mode), a maintenance mode (e.g., where authorized personnel are authorized to access the vehicle), a private-facing mode, and/or any other mode describing the authorization capability of the vehicle 102. By way of example, a public-facing mode can be one in which the vehicle 102 can be authorized to service a transportation service request (e.g., a ride-sharing request, etc.). The maintenance mode can be one in which the vehicle 102 can be authorized to receive maintenance (e.g., from one or more authorized maintenance service providers, etc.). The private-facing mode can be one in which the vehicle 102 can be authorized for private use by a vehicle operator (e.g., via one or more manual inputs to one or more manual touchpoint while in a manual operation mode, etc.) and/or where the vehicle 102 performs a task for the service entity like vehicle-assistance, data collection, etc. As an example, an instruction to change the operational status mode can be received from an authorized user (e.g., via a user device of a maintenance provider, via user input of the maintenance provider to an onboard user device, etc.), operations computing system 104 (e.g., service entity system, etc.), etc. to, for example, authorize the vehicle 102 for manual control (e.g., to tow the vehicle 102, test one or more vehicle components, etc.), authorized the vehicle 102 for full autonomous control (e.g., to provide an autonomous ride-sharing service, etc.).

An indication, record, and/or other data indicative of the operating mode, the operational status mode, the state of the vehicle, the state of one or more passengers of the vehicle, and/or the state of an environment including one or more objects (e.g., the physical dimensions and/or appearance of the one or more objects) can be stored locally in one or more memory devices of the autonomous vehicle 102. Additionally, the autonomous vehicle 102 can provide data indicative of the operating mode, the operational status mode (e.g., ridesharing, etc.), the state of the vehicle, the state of one or more passengers of the vehicle, and/or the state of an environment to the operations computing system 104, which can store an indication, record, and/or other data indicative of the operating mode, the operational status mode (e.g., ridesharing, etc.), and/or the state of the one or more objects within a predefined distance of the autonomous vehicle 102 in one or more memory devices associated with the operations computing system 104 (e.g., remote from the vehicle). Furthermore, the autonomous vehicle 102 can provide data indicative of the state of the one or more objects (e.g., physical dimensions and/or appearance of the one or more objects) within a predefined distance of the autonomous vehicle 102 to the operations computing system 104, which can store an indication, record, and/or other data indicative of the state of the one or more objects within a predefined distance of the autonomous vehicle 102 in one or more memory devices associated with the operations computing system 104 (e.g., remote from the vehicle).

The autonomous vehicle 102 can include and/or be associated with the vehicle computing system 112. The vehicle computing system 112 can include one or more computing devices located onboard the autonomous vehicle 102. For example, the one or more computing devices of the vehicle computing system 112 can be located on and/or within the autonomous vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the autonomous vehicle 102 (e.g., its computing system, one or more processors, and other devices in the autonomous vehicle 102) to perform operations and functions, including those described herein.

The vehicle computing system 112 can store and/or otherwise access vehicle data associated with the autonomous vehicle 102. The vehicle data, for example, can include operational data associated with an operating mode of the vehicle 102 and/or operational states for one or more components of the vehicle 102. As an example, the vehicle data can be indicative of an operating mode (e.g., vehicle autonomy mode) and/or an operational status mode (e.g., ridesharing, etc.) for the autonomous vehicle 102.

More particularly, the vehicle data can identify the current operating mode (and/or a current operational-status mode) of the vehicle 102 and/or one or more operating modes (and/or operational-status modes) preceding and/or subsequent to the current vehicle operating mode (and/or current operational-status mode). For example, in some implementations, the vehicle data can identify an anticipated operating mode. The anticipated operating mode can include a predicted operating mode at a future point in time (e.g., one or more seconds, minutes, etc. subsequent to the current time). The vehicle computing system 112 can determine an anticipated operating mode, for example, based on one or more operational constraints of the autonomous vehicle 102, rider preferences associated with a passenger of the autonomous vehicle 102, map data 122 indicative of the surrounding environment of the autonomous vehicle, a vehicle route, and/or any other data associated with the operation of the vehicle 102.

In some implementations, the vehicle data can include activation data associated with the operational state of one or more components of the vehicle 102. As an example, the vehicle can include a plurality of airbags (e.g., a first, second, and third airbag, etc.) placed throughout the vehicle's interior (e.g., a passenger compartment of the vehicle). In such a case, the activation data can include an airbag activation state for one or more of the airbags located within the vehicle interior (e.g., passenger compartment). For instance, each of the plurality airbags can be associated with a respective airbag activation state. Each airbag can be associated with an activated state and/or a deactivated state. The activated state can indicate that the airbag is ON and can be deployed in the event a triggering condition exists (e.g., an indication of an impact with another object, etc.). The deactivated state can indicate that the airbag is OFF and will not and/or cannot be deployed in the event a triggering condition exists. As discussed in further detail herein, an airbag can be deactivated in the event that it is covered by another airbag (e.g., and thus redundant or potentially hazardous if deployed) and/or based on sensor data indicative of an at-risk passenger (e.g., a passenger that achieves a height, age, weight, threshold, etc.).

As depicted in FIG. 1, the vehicle computing system 112 can include one or more sensors 114, the positioning system 118, the autonomy computing system 120, the communication system 136, the vehicle control system(s) 138, and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The sensor(s) 114 can include a plurality of external sensors (e.g., LiDAR sensors, outward facing cameras, etc.) and/or internal sensors (e.g., tactile sensors (e.g., touch sensors within seats of a vehicle interior, on the handle of a vehicle door, etc.), internal facing microphones, internal facing cameras, etc.). As discussed herein, the internal sensor(s) and/or external sensor(s) can be utilized by the vehicle computing system 112 to gather internal sensor data associated with a vehicle 102 such as, for example, occupancy data identifying the state (e.g., the position and/or orientation) of one or more passengers riding within the vehicle 102.

Figure 2A:
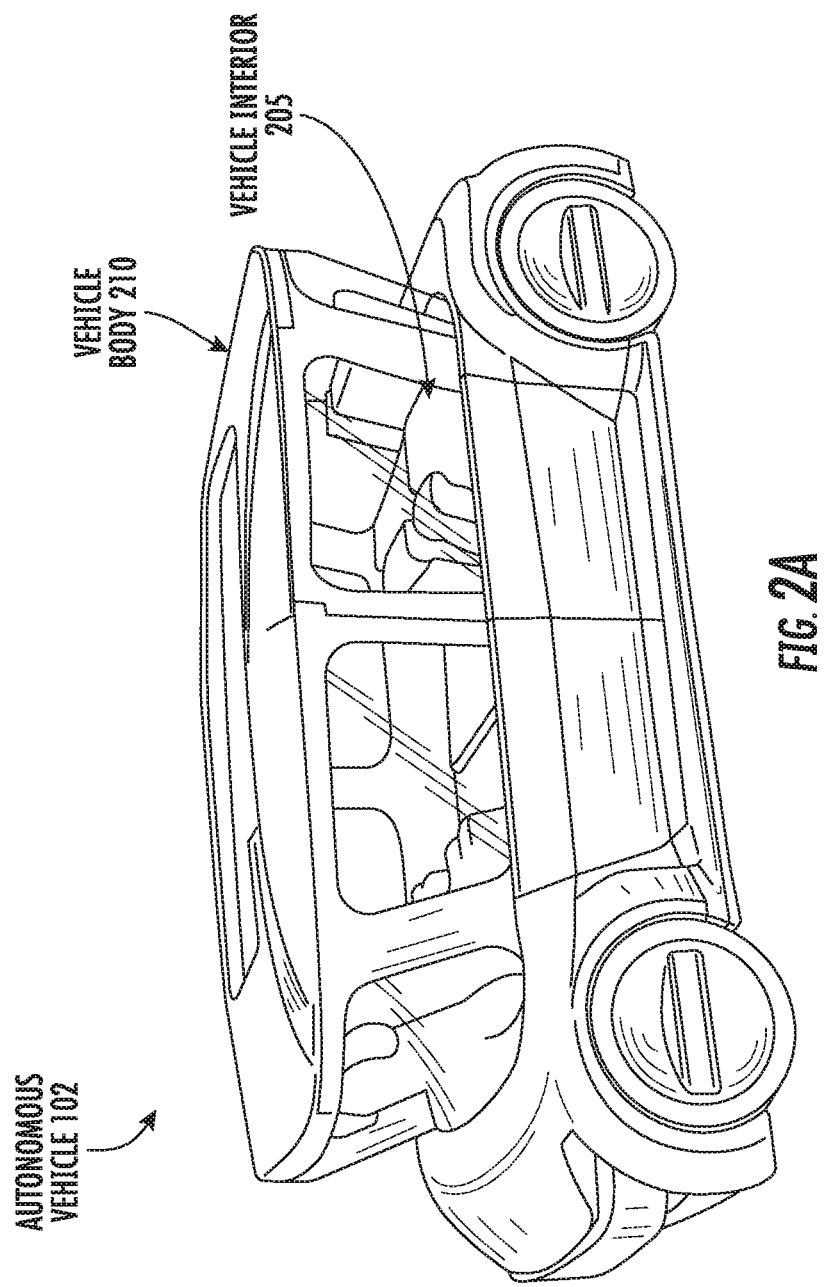
FIG. 2A depicts an autonomous vehicle according to example embodiments of the present disclosure.

More particularly, the vehicle computing system 112 can include and/or be associated with a plurality of external sensors (e.g., LiDAR sensors, outward facing cameras, etc.) and/or interior sensors (e.g., internal facing cameras/heat sensors, internal facing microphones, tactile sensors (e.g., touch sensors within seats of a passenger compartment, on the handle of a vehicle door, etc.), etc.). With reference to FIG. 2A, the sensor(s) 114 can be located on various parts of the autonomous vehicle 102 including the passenger compartment 205, a front side, rear side, left side, right side, top, or bottom of the vehicle body 210, etc. For instance, the sensor(s) 114 can be placed throughout the vehicle 102 to obtain sensor data indicative of the presence of objects and/or humans currently and/or predicted to be within and/or proximate to the vehicle's interior 205. The sensor data, for example, can be obtained by the interior sensors such as one or more cameras configured to obtain image data, one or more microphones configured to obtain auditory data, one or more tactile sensors configured to obtain tactile data (e.g., to detect a touch to a seat to determine whether an object and/or passenger is placed on or sitting in a passenger seat, etc.), heat sensor(s), weight sensor(s), etc. In addition, or alternatively, the sensor data can be obtained by the external sensors such as one or more external sensors configured to detect a passenger or object in the process of entering and/or exiting the vehicle's interior 205. For instance, the external sensors can include infrared sensors that wrap around the vehicle's body 210 (e.g., a side of the vehicle that includes an entry and/or exit to the vehicle, etc.), camera(s), LiDAR sensors, microphones, tactile sensors (e.g., to detect a touch to a door (e.g., a handle of the door) of the vehicle, etc.), etc. In addition, other sensors can be utilized to generate and/or obtain sensor data such as, for example, ultrasonic sensors, RADAR sensor (e.g., placed along the side of the vehicle, etc.) and/or any other sensor capable of generating and/or obtaining data indicative of an object and/or passenger's proximity to the vehicle 102.

Turning back to FIG. 1, the sensor(s) 114 can be configured to generate and/or store data including the sensor data 116. The sensor data 116 can include the internal sensor data, external sensor discussed above, and well an autonomy sensor data associated with one or more objects that are proximate to the autonomous vehicle 102 (e.g., within range or a field of view of one or more of the one or more sensors 114 (e.g., external sensor(s)). For instance, the sensor(s) 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data can include image data, radar data, LIDAR data, and/or other data acquired by the sensor(s) 114. The one or more objects can include, for example, pedestrians, vehicles, bicycles, and/or other objects. The autonomy sensor data can be indicative of locations associated with the one or more objects within the surrounding environment of the autonomous vehicle 102 at one or more times. For example, the autonomy sensor data can be indicative of one or more LIDAR point clouds associated with the one or more objects within the surrounding environment. The sensor(s) 114 can provide autonomy sensor data to the autonomy computing system 120.

In addition to the sensor data 116, the autonomy computing system 120 can retrieve or otherwise obtain data including the map data 122. The map data 122 can provide detailed information about the surrounding environment of the autonomous vehicle 102. For example, the map data 122 can provide information regarding: the identity and location of different roadways, road segments, buildings, or other items or objects (e.g., lampposts, crosswalks and/or curb), the location and directions of traffic lanes (e.g., the location and direction of a parking lane, a turning lane, a bicycle lane, or other lanes within a particular roadway or other travel way and/or one or more boundary markings associated therewith), traffic control data (e.g., the location and instructions of signage, traffic lights, or other traffic control devices), and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the autonomous vehicle 102. The positioning system 118 can be any device or circuitry for analyzing the position of the autonomous vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the autonomous vehicle 102 can be used by various systems of the vehicle computing system 112 and/or provided to one or more remote computing devices (e.g., the operations computing system 104 and/or the remote computing device 106). For example, the map data 122 can provide the autonomous vehicle 102 relative positions of the surrounding environment of the autonomous vehicle 102. The autonomous vehicle 102 can identify its position within the surrounding environment (e.g., across six axes) based at least in part on the data described herein. For example, the autonomous vehicle 102 can process the autonomy sensor data (e.g., LIDAR data, camera data) to match it to a map of the surrounding environment to get an understanding of the vehicle's position within that environment (e.g., transpose the autonomous vehicle's 102 position within its surrounding environment).

The autonomy computing system 120 can include a perception system 124, a prediction system 126, a motion planning system 128, and/or other systems that cooperate to perceive the surrounding environment of the autonomous vehicle 102 and determine a motion plan for controlling the motion of the autonomous vehicle 102 accordingly. In some examples, many of the functions performed by the perception system 124, prediction system 126, and motion planning system 128 can be performed, in whole or in part, by a single system and/or multiple systems that share one or more computing resources. For instance, one or more of the perception system 124, prediction system 126, and motion planning system 128 can be combined into one system configured to perform the functions of each of the systems. In addition, or alternatively, the one or more of the perception system 124, prediction system 126, and motion planning system 128 can be configured to share and/or have access to one or more common computing resources (e.g., a shared memory, communication interfaces, processors, etc.).

As an example, the autonomy computing system 120 can receive the sensor data 116 from the one or more sensors 114, attempt to determine the state of the surrounding environment and/or the vehicle's interior by performing various processing techniques on the sensor data 116 (and/or other data). The autonomy computing system 120 can generate an appropriate motion plan through the surrounding environment based on state of the surrounding environment and the vehicle's interior. In some examples, the autonomy computing system 120 can use the sensor data 116 as input to a one or more machine-learned models that can detect objects within the sensor data 116, forecast future motion of those objects, and select an appropriate motion plan for the autonomous vehicle 102. The machine-learned model(s) can be included within one system and/or share one or more computing resources.

As another example, the perception system 124 can identify one or more objects that are proximate to and/or within the autonomous vehicle 102 based on sensor data 116 received from the sensor(s) 114. In particular, in some implementations, the perception system 124 can determine, for each object, state data 130 that describes the current state of such object. As examples, the state data 130 for each object can describe an estimate of the object's: current location (e.g., relative to one or more interior vehicle components, the surrounding environment of the vehicle, etc.); current speed; current heading (which may also be referred to together as velocity); current acceleration; current orientation (e.g., with respect to the direction of travel of the vehicle, etc.); size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate and/or within the autonomous vehicle 102 over time, and thereby produce a presentation of the world around and within the vehicle 102 along with its state (e.g., a presentation of the objects of interest within a scene/passenger compartment at the current time along with the states of the objects).

The prediction system 126 can receive the state data 130 from the perception system 124 and predict one or more future locations and/or moving paths for each object based on such state data 130. For example, the prediction system 126 can generate prediction data 132 associated with each of the respective one or more objects proximate and/or within the vehicle 102. The prediction data 132 can be indicative of one or more predicted future locations of each respective object. The prediction data 132 can be indicative of a predicted path (e.g., predicted trajectory) of at least one object within the interior and/or the surrounding environment of the autonomous vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the autonomous vehicle 102 based at least in part on the prediction data 132 (and/or other data). The motion plan data 134 can include vehicle actions with respect to the objects proximate to the autonomous vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the autonomous vehicle 102 can perform a certain action (e.g., pass an object) without increasing the potential risk to the autonomous vehicle 102 and/or violating any traffic laws (e.g., speed limits, lane boundaries, signage). The motion plan data 134 can include a planned trajectory, velocity, acceleration, and/or other actions of the autonomous vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle control system 138 that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the autonomous vehicle 102.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the autonomous vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include one or more human-machine interfaces 140. For example, the vehicle computing system 112 can include one or more display devices located on the vehicle computing system 112. A display device (e.g., screen of a tablet, laptop, and/or smartphone) can be viewable by a user of the autonomous vehicle 102 that is located in the front of the autonomous vehicle 102 (e.g., driver's seat, front passenger seat). Additionally, or alternatively, a display device can be viewable by a user of the autonomous vehicle 102 that is located in the rear of the autonomous vehicle 102 (e.g., a passenger seat in the back of the vehicle). The human-machine interface(s) 140 can include one or more steering devices, signaling devices, braking devices, etc. that can allow a user to provide input that can be used to explicitly control the motion of the autonomous vehicle 102 (e.g., in a manual mode), signal actions/intents to the exterior environment, etc. and/or at least provide suggested input for the autonomous vehicle 102 to consider while autonomously operating the vehicle.

Figure 2B:
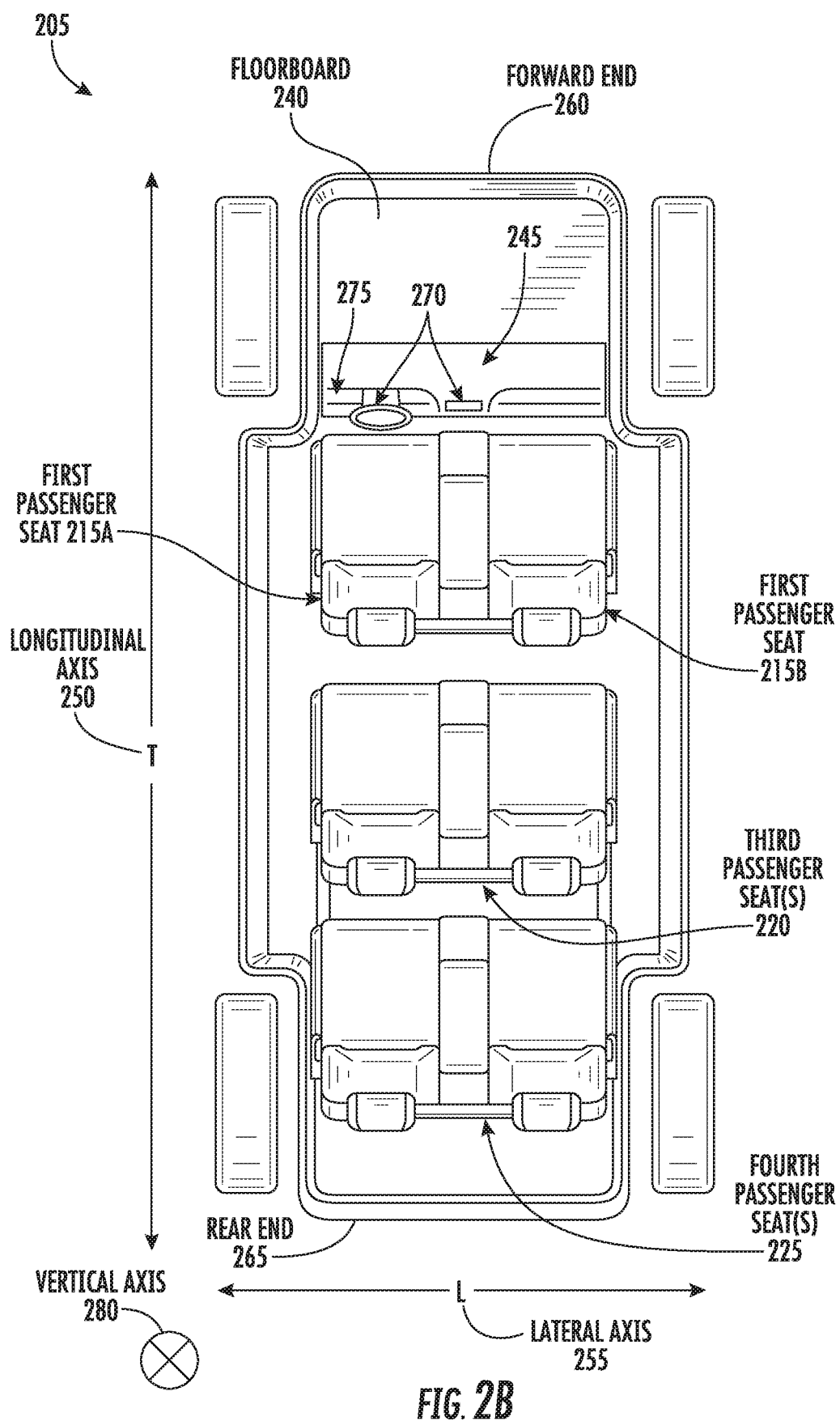
FIG. 2B depicts an example passenger compartment of an autonomous vehicle according to example embodiments of the present disclosure.

Turning to FIG. 2B, FIG. 2B depicts an example autonomous passenger compartment 205 according to example embodiments of the present disclosure. For example, a passenger compartment 205 can define a longitudinal direction 250 (e.g., along a longitudinal axis), a lateral direction 255 (e.g., along a lateral axis), and a vertical direction (e.g., perpendicular to the lateral and longitudinal axes). The passenger compartment 205 can include one or more vehicle seats 215A-B, 220, 225 to support one or more passengers of the vehicle. For instance, the passenger compartment 205 can include a floorboard 240 with one or more mechanical components (e.g., sliding tracks, spring loaded levers, locking pins, and/or other locking mechanisms, etc.) placed therein configured to couple one or more mechanical components (e.g., sliding skids, wheels, spring loaded levers, locking pins, and/or any the attachment mechanisms, etc.) of the vehicle seats 215, 220, 225 to the floor 240 of the passenger compartment 205. The mechanical components can be placed throughout the floor 240 of the passenger compartment 205 to enable a plurality of different seat configurations within the autonomous vehicle.

The passenger compartment 205 can have a forward end 260 and a rear end 265 spaced apart from the forward end 260 along the longitudinal direction 250. The passenger compartment 205 can include a front panel 245 disposed proximate to the forward end 260 of the passenger compartment 205 (e.g., more towards the forward end 260 than the rear end 265), one or more vehicle control device(s) 270 located at the front panel 245, and/or a moveable cover panel located at the front panel 245. One or more of the vehicle control device(s) 170 and/or the moveable cover panel can be located at the front panel 245 in that, for example, it can extend through, attach to, be affixed to, couple to, extend over, extend under, etc. the front panel 245 of the vehicle and/or one or more components and/or portions of the front panel 245. The front panel 245 can be located at a front windshield of the autonomous vehicle such that it is nearby, proximate, closer to, etc. a front windshield of the autonomous vehicle than an opposite end. The vehicle control device(s) 270 can include one or more manual touch points/mechanisms with which a passenger can interact to control one or more aspects (e.g., steering, signaling, deceleration/acceleration, entertainment, maintenance, etc.) of the autonomous vehicle. The manual touch points, for example, can include one or more steering devices, climate control devices, entertainment devices, signaling devices (e.g., to activate one or more turning signals, etc.), windshield devices (e.g., to activate windshield wipers, cleaning fluid, etc.), acceleration/braking pedals, etc.

As an example, the vehicle control device(s) 270 can include a vehicle motion control device. For instance, the vehicle motion control device can include a steering device configured to steer the autonomous vehicle and/or one or more acceleration/braking devices associated with controlling the acceleration and/or deceleration of the vehicle (e.g., a braking/acceleration paddles/buttons/pedals, etc.). The steering device can include, for example, a steering wheel, joystick, and/or other type of form factor. The steering device, for example, can be manually and/or autonomously moved (e.g., twisted, turned, etc.) to navigate and/or steer the autonomous vehicle. In some implementations, the vehicle control device(s) 270 can be disposed within the front panel 245, extend through/over/under etc. the front panel 245, be connected to the front panel 245, etc. By way of example, the front panel 245 can include a receding portion 275 and a steering device can be coupled to the receding portion 275 of the front panel 245 by a telescopic actuator configured to recede within the receding portion 275 of the front panel 245. In addition, or alternatively, the front panel 245 can include one or more touch interfaces, interactive buttons, and/or one or more other control devices disposed therein to manually control one or more other aspects of the autonomous vehicle.

Figure 3A:
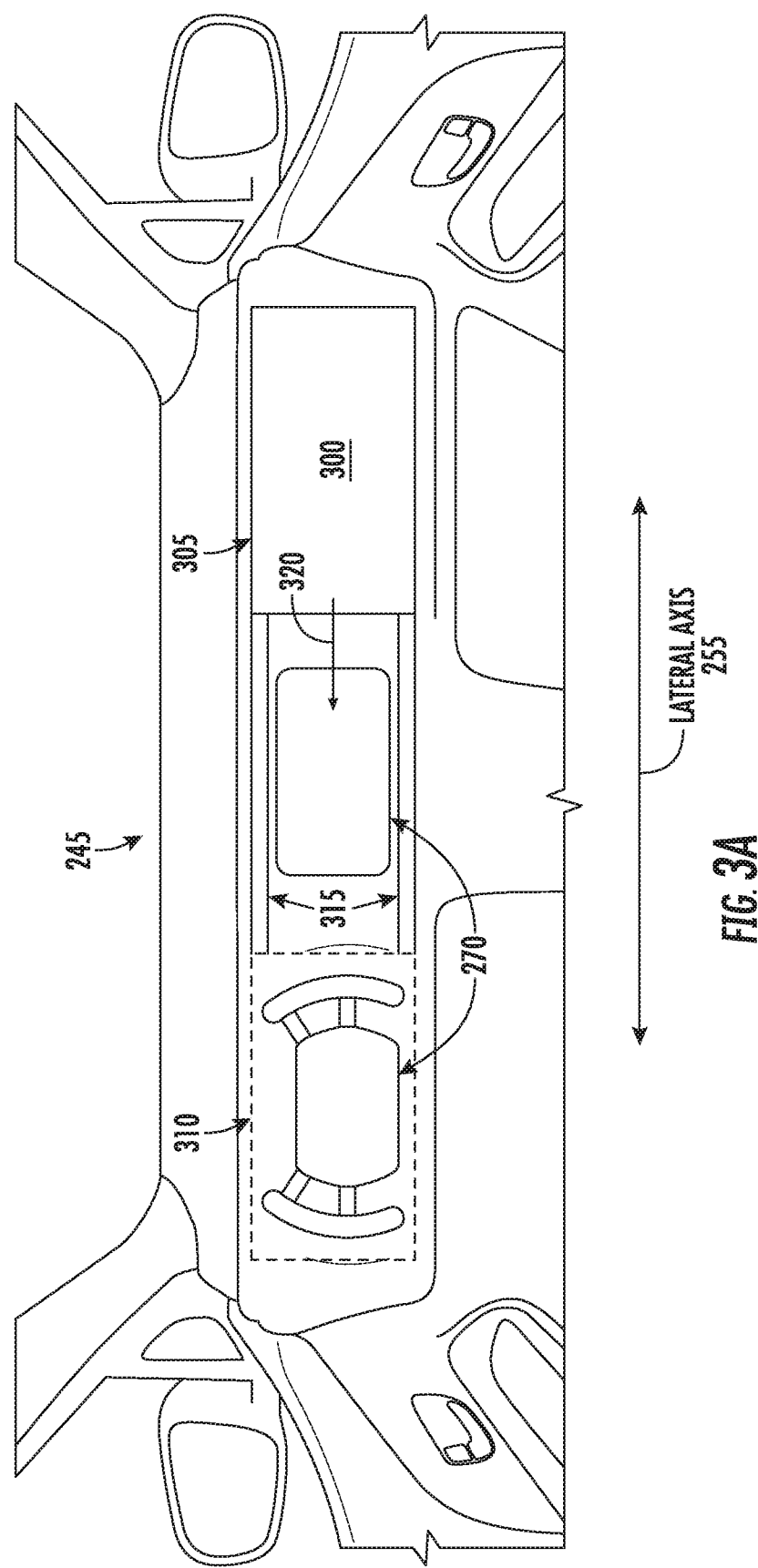
FIG. 3A depicts an example configurable cover panel according to example embodiments of the present disclosure.

FIG. 3A depicts an example configurable cover panel 300 according to example embodiments of the present disclosure. The cover panel 300 located at the front panel 245 can be configured to isolate and/or expose one or more of the control device(s) 270. For example, as described herein, the cover panel 300 can extend through, attach to, couple to, extend over/under, etc. the front panel 245 of the vehicle and/or one or more components and/or portions of the front panel 245. The cover panel 300 can be configured to isolate one or more of the control device(s) 270 from the passenger compartment and/or one or more passengers within the passenger compartment by covering the control device(s) 270.

More particularly, the cover panel 300 can be moveable (e.g., slidable, rollable, etc.) relative to the front panel 245 between an isolating position 310 and an exposing position 305. The cover panel 300 can isolate (e.g., cover, separate, detach, exclude, etc.) one or more of the vehicle control device(s) 270 from the passenger compartment when in the isolating position 310. For example, the cover panel 300 can be configured to substantially, partially, and/or completely cover one or more of the control device(s) 270 of the autonomous vehicle such that the cover panel 300 can prevent a user from physically manipulating/contacting and/or seeing the control device(s) 270 when the cover panel 300 is positioned at the isolating position 310. In this manner, the cover panel 300 can be configured to isolate one or more of the vehicle control device(s) 270 from one or more passengers (e.g., from inferring with the one or more passengers, etc.) within the passenger compartment.

The example positions of the cover panel 300 are provided by example only and are not intended to be limiting unless explicitly stated. In some implementations, the cover panel 300 may be positioned under the front panel 245 to isolate other vehicle control device(s) 270 such as, for example, one or more pedals (e.g., foot pedals, brake pedals, acceleration pedals, etc.) and/or any other devices/mechanisms located under the front panel 245.

The cover panel 300 can be moved away from the one or more of the control device(s) 270 when the cover panel 300 is in the exposing position 305. For example, the control device(s) 270 can be exposed to the passenger compartment of the vehicle such that a user can physically contact/manipulate and/or see the control device(s) 270 when the cover panel 300 is in the exposing position 305. In this manner, a vehicle control device can be assessible by passenger(s) within the passenger compartment of the vehicle while the cover panel 300 is in the exposing position 305.

In some implementations, the cover panel 300 can include a sliding panel coupled to the front panel 245 (and/or one or more component under the front panel 245) by one or more attachment mechanisms 315 (e.g., tracks, rails, hinges, etc.). For instance, the front panel 245 can include one or more mechanical components (e.g., sliding tracks, spring loaded levers, locking pins, and/or other locking mechanisms, etc.) placed therein (and/or under) configured to couple to one or more mechanical components (e.g., sliding skids, wheels, spring loaded levers, locking pins, and/or any the attachment mechanisms, etc.) of the cover panel 300. As an example, the front panel 245 (and/or one or more components underneath the front panel 245) can include one or more tracks 315 configured to couple to one or more sliding skids of the cover panel 300. In such a case, the cover panel 300 can be affixed to the front panel 245 by one or more compatible attachment mechanisms of the front panel 245 (e.g., tracks on/under/within the front panel 245, etc.) and the cover panel 300 (e.g., sliding skids, etc.).

The cover panel 300 can be configured to slide (at 320) (e.g., via rollers, gliders, skids, etc.) along the one or more attachment mechanisms 315 (e.g., tracks) to move between the exposing position 305 and the isolating position 310 and (e.g., to isolate and/or provide access to the vehicle control device(s)). As an example, the one or more attachment mechanisms can be positioned along the lateral direction 255 of the front panel 245 (e.g., tracks in which wheels of the cover panel 300 can fit). In such a case, the cover panel 300 can be configured to slide laterally 255 (in both directions) across the front panel 245 to isolate (e.g., at the isolating position 310) and/or expose (e.g., at the exposing position 305) one or more of the control device(s) 270.

Figure 3B:
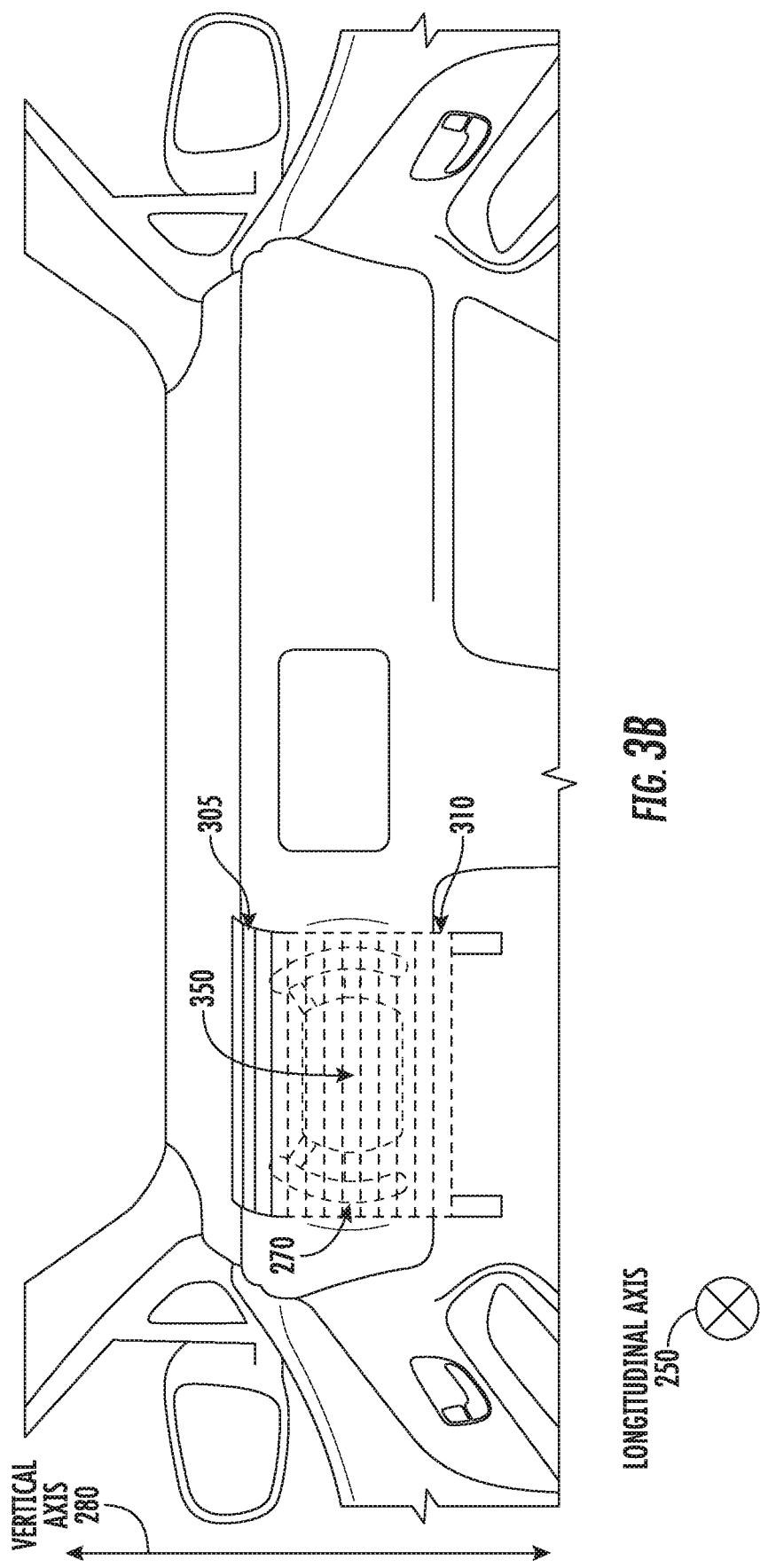
FIG. 3B depicts another example configurable cover panel according to example embodiments of the present disclosure.

In addition, or alternatively, with reference to FIG. 3B, the one or more attachment mechanisms can be positioned along the vertical direction of the front panel 245. In such a case, the cover panel 300 can be configured to slide vertically (e.g., along the vertical axis 280) (and/or in part longitudinally (e.g., along the longitudinal axis 250) across the front panel 245 (e.g., at 350) to isolate (e.g., at the isolating position 310) and/or expose (e.g., at the exposing position 305) one or more of the control device(s) 270. By way of example, the cover panel 300 can include a roll top panel. The roll top panel can be configured to extend vertically (e.g., along the vertical axis 270) and/or longitudinally (e.g., along the longitudinal axis 250) along the front panel 245 to isolate one or more of the control device(s) 270 located at the front panel 245 and retract vertically (e.g., along the vertical axis 270) and/or longitudinally (e.g., along the longitudinal axis 250) along the front panel 245 to expose one or more of the control device(s) 270 located at the front panel 245.

As another example, the one or more attachment mechanisms can be positioned along one or more components (e.g., foot well, etc.) underneath the front panel in the vertical/lateral/longitudinal direction of the passenger compartment. In such a case, the cover panel 300 can be configured to slide vertically/laterally/longitudinally, etc. (e.g., along the a respective axis) across the one or more components to isolate (e.g., at the isolating position 310) and/or expose (e.g., at the exposing position 305) one or more of the control device(s) 270 under the front panel 245.

The cover panel 300 can be configured to be manually and/or automatically moved between the isolating position 310 and the exposing position 305. For instance, a vehicle operator, passenger, remote operator, etc. can interact with the cover panel 300 and/or one or more components of the cover panel 300 to manually and/or automatically slide the cover panel 300 between the isolating position 310 and the exposing position 305. By way of example, a vehicle operator and/or passenger can provide a force (e.g., push, pull, etc.) to the cover panel 300 to move the cover panel 300 between positions.

In addition, or alternatively, the cover panel 300 can include and/or be associated with a triggering mechanism (e.g., one or more interactive buttons, switches, remote activation devices, etc.) that can initiate the automatic movement between the isolating position 310 and the exposing position 305. For instance, the cover panel 300 and/or the front panel 245 can include a panel motor (e.g., direct current motor (e.g., permanent magnet DC motor, series DC motor, shunt DC motor, compound DC motor, etc.), alternating current motor (e.g., induction motor, synchronous motor, etc.), universal motor, etc.). The panel motor can be coupled to one or more of the mechanical component(s) of the cover panel 300 and/or the front panel 245. The panel motor can be configured to receive (e.g., via a vehicle computing system, operations computing system, one or more triggering mechanisms associated with the cover panel 300, etc.) and implement instructions to move the cover panel 300 between the isolating position 310 and the exposing position 305 in accordance with the implementations described herein.

In some implementations, the cover panel 300 can be locked, fastened, etc. (e.g., via one or more locking pins, one or more manual lock and keys, combination locks, magnetic locks, electrical locks, and/or any other locking device) at an isolating position 310 and/or an exposing position 305. By way of example, the cover panel 300 can be manually and/or automatically locked, fastened, etc. to a current position (e.g., isolating position 310, exposing position 305, etc.) such that the cover panel 300 is prevented (at least in part) from being moved from the current position. In such a case, the cover panel 300 can be manually (e.g., with a key, etc.) and/or automatically unlocked before moving between the isolating 310 and exposing positions 305. As an example, the cover panel 300 can include and/or be associated with a locking state. The cover panel 300 can be prevented from moving (e.g., locked at a current position) while the locking state is active and movable (e.g., unlocked at a current position) between the isolating position 310 and the exposing position 305 while the locking state is inactive. Authorized personnel (e.g., maintenance operator, etc.) can utilize a key, code, etc. to unlock the cover panel 300.

Figure 4A:
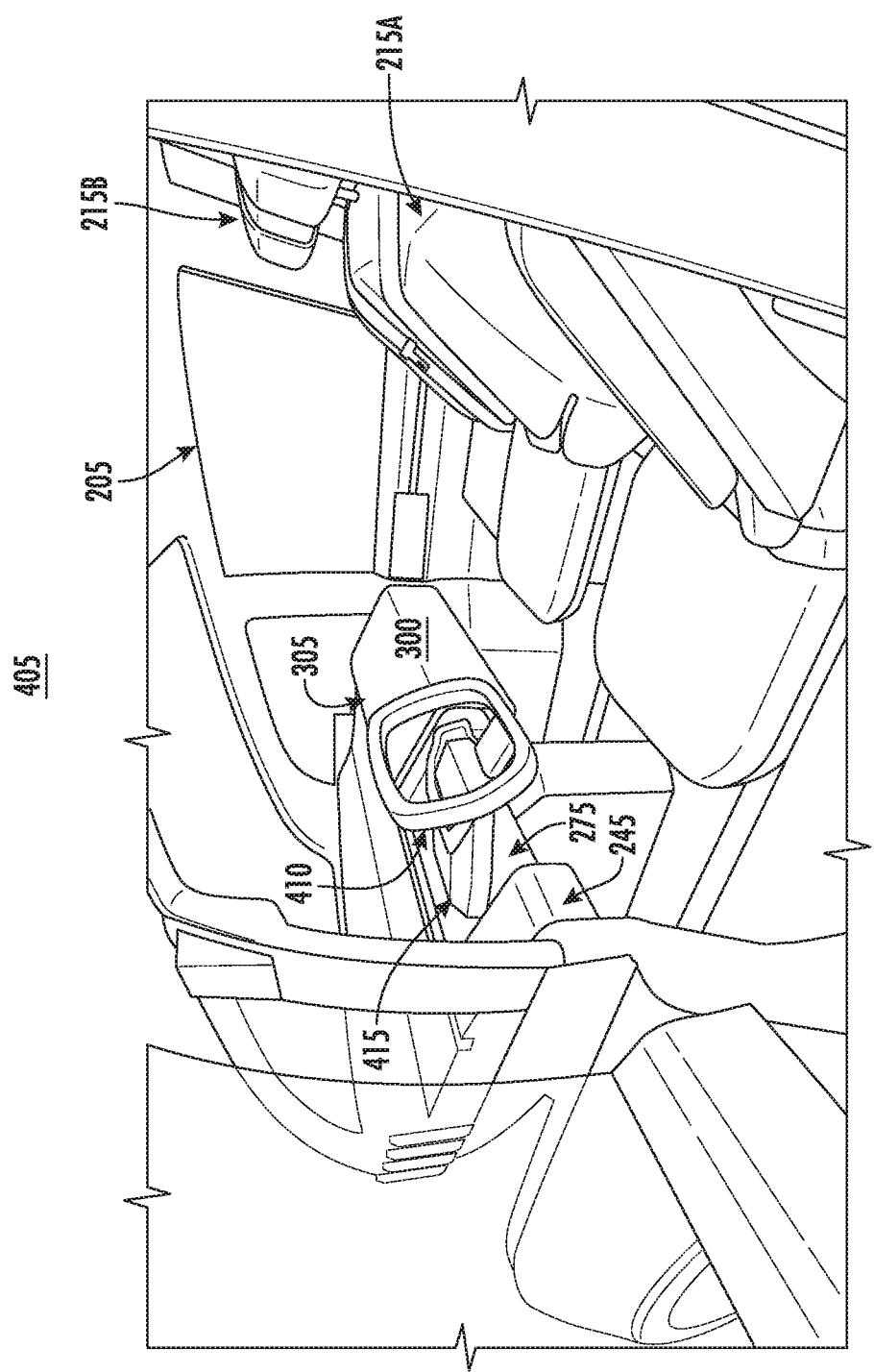

FIGS. 4A-4D depict an example cover panel configuration according to example embodiments of the present disclosure. FIG. 4A depicts a configuration 405 where the cover panel 300 is at the exposing position 305 such that a steering device 410 is exposed to the passenger compartment 205 (and/or one or more passenger seats 215A-B of the passenger compartment 205). The steering device 410 can be coupled to the receding portion 275 of the front panel 245 by an actuator 415 (e.g., telescopic actuator, linear actuator, etc.) configured to recede within the receding portion 275 of the front panel 245. The receding motion can be performed automatically via a motor, servo, etc. and/or manually via a user provided force.

Figure 4B:
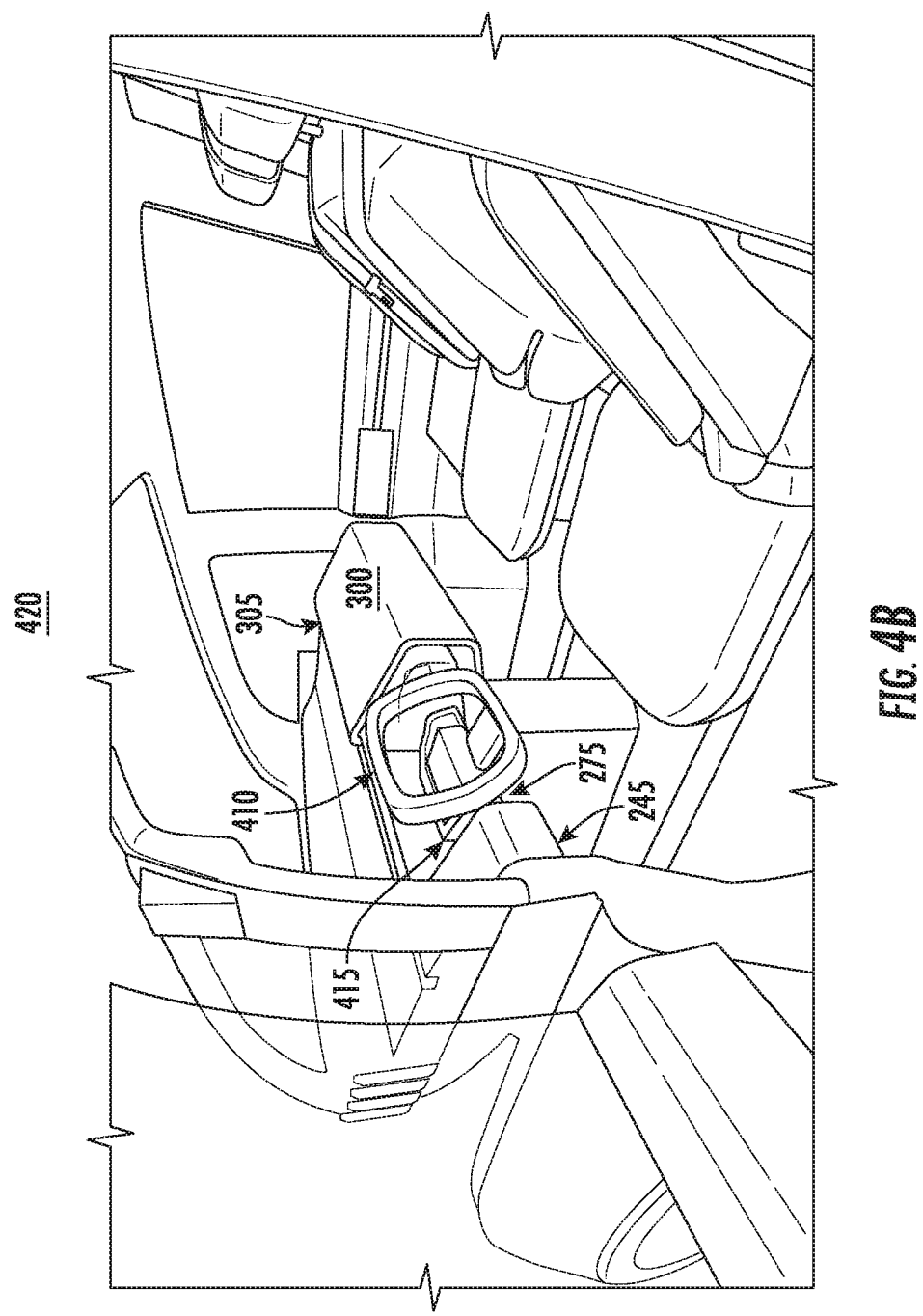
Figure 4D:
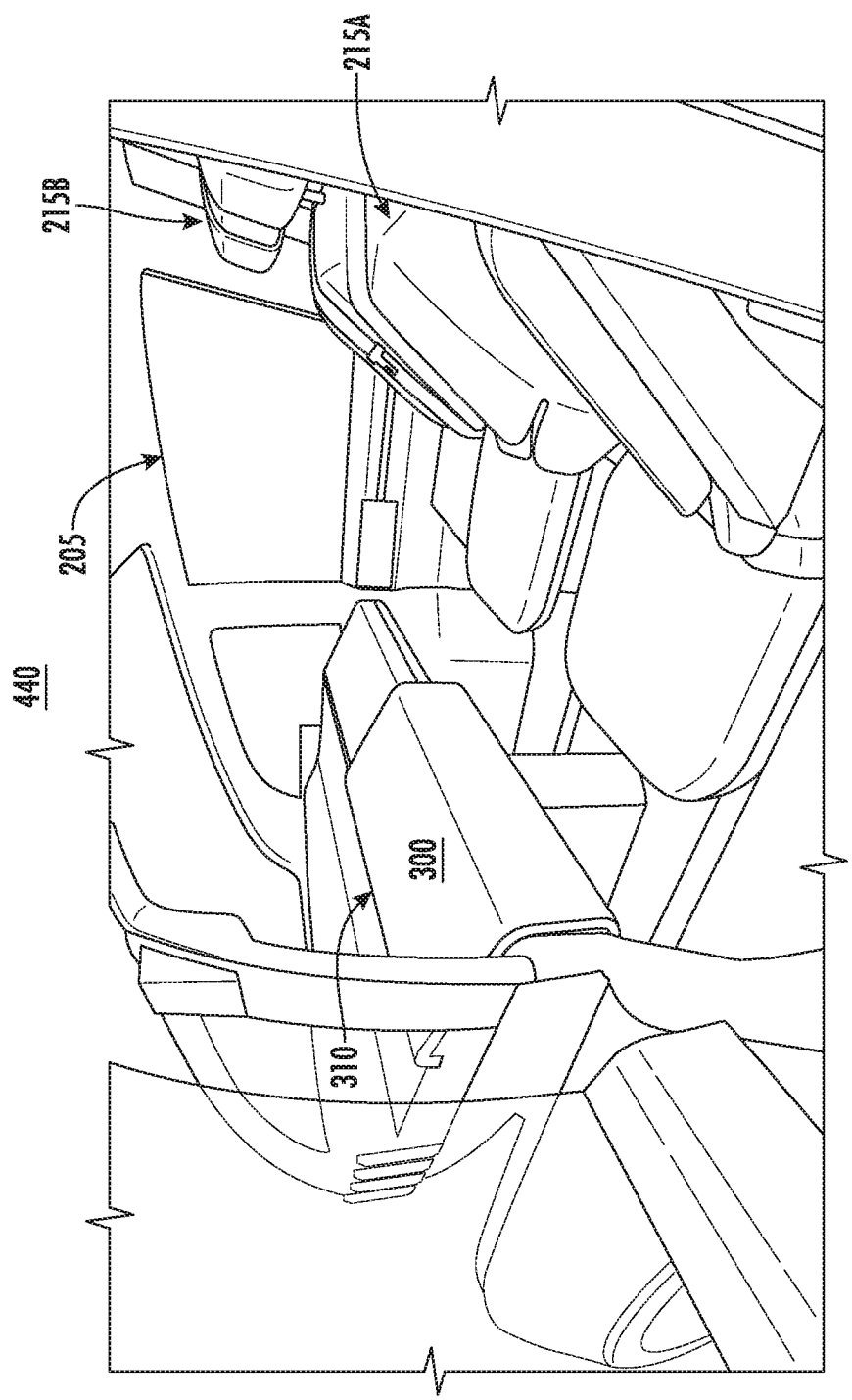

At configuration 405, the actuator 415 can be extended such that the steering device 410 extends out from the receding portion 275. FIG. 4B depicts another configuration 420 where the cover panel 300 is at the exposing position 305. In configuration 420 the actuator 415 can be retracted such that the steering device 410 recedes within the receding portion 275 of the front panel 245. In some implementations, the actuator 415 can be configured to retract within the receding portion 275 of the front panel 245 before the cover panel 300 moves from the exposing position 305. For example, FIG. 4C depicts configuration 430 in which the cover panel 300 is partially moved across the steering device 410. The steering device 410 can be retracted within the receding portion 275 of the front panel 245 to allow the cover panel 300 to cover the steering device 410. FIG. 4D depicts configuration 440 in which the cover panel 300 is at the isolating position 310. At isolating position 310, the steering device can be covered and/or otherwise isolated from the passenger compartment 205 (and/or one or more passenger seats 215A-B of the passenger compartment 205).

Figure 5:
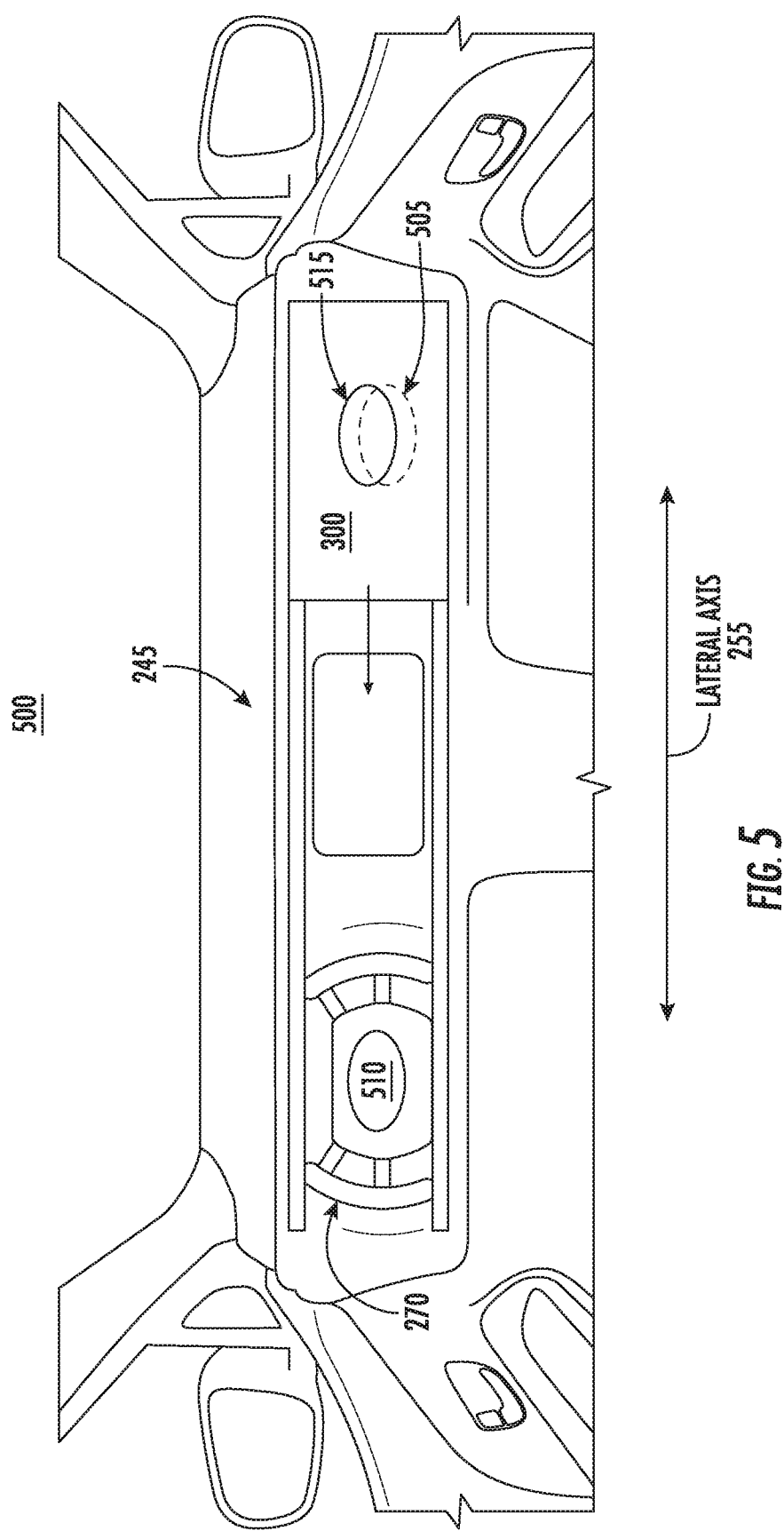
FIG. 5 depicts an example airbag layout according to example embodiments of the present disclosure.

Turning to FIG. 5, FIG. 5 depicts an example airbag layout 500 according to example embodiments of the present disclosure. As depicted, the front panel 245 and/or one or more components located at the front panel 245 can include one or more of a plurality of airbags 505, 510, 515. For instance, the front panel 245 can include a first airbag 505, a vehicle control device 270 can include a second airbag 510, and/or the cover panel 300 can include a third airbag 515. The first airbag 505, for example, can be located within a portion of the front panel 245 spaced apart from the vehicle control device 270 in the lateral direction (e.g., along the lateral axis 255). By way of example, the vehicle control device 270 can be located in front of a first passenger seat (e.g., a potential "driver seat") within the passenger compartment of the autonomous vehicle. In such a case, the first airbag 505 can be located within the front panel 245 in front of a second passenger seat within the passenger compartment of the autonomous vehicle (e.g., a "front passenger seat"). The first passenger seat can be spaced apart from the second passenger seat along the lateral direction (e.g., along the lateral axis 255) of the passenger compartment. In this manner, the first airbag 505 can be laterally opposite to the second airbag 510.

Figure 6:
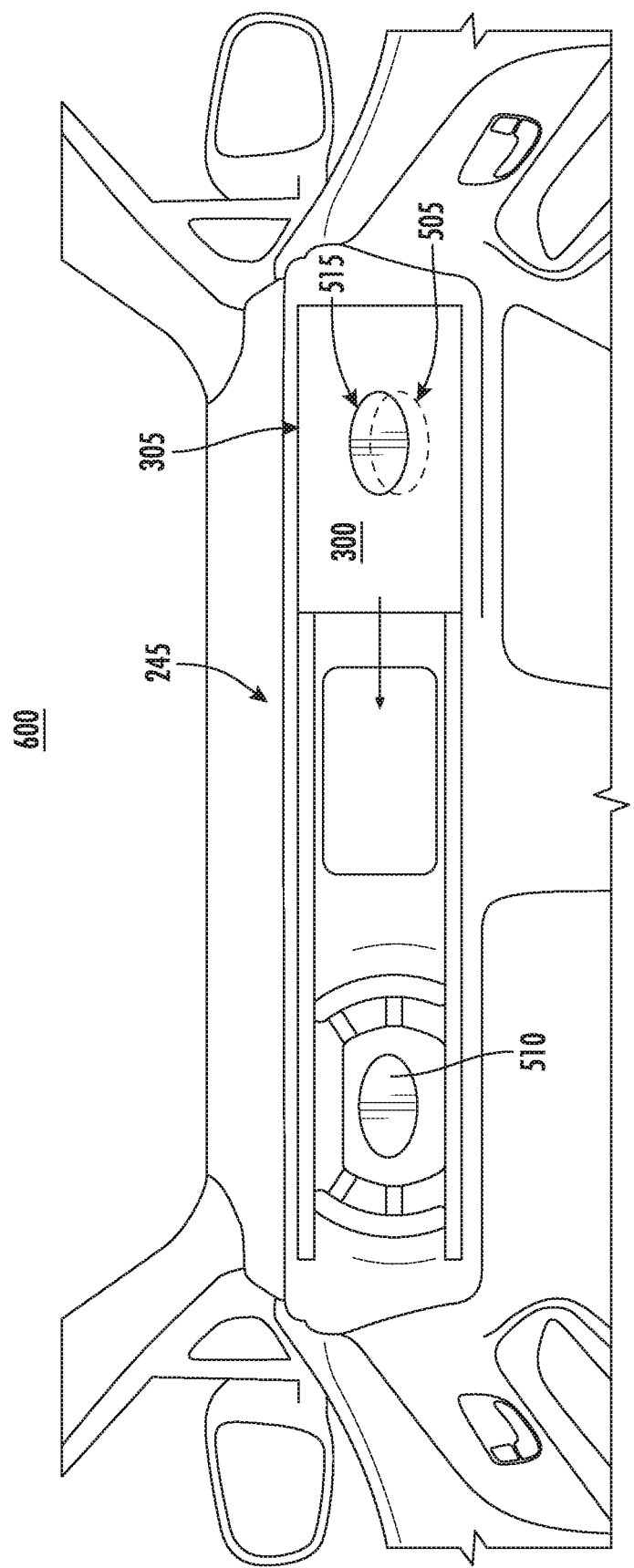
FIG. 6 depicts an example airbag activation scheme according to example embodiments of the present disclosure.

The airbags 505, 510, and 515 can be activated and/or deactivated based on the position of the cover panel 300. For example, FIG. 6 depicts an example airbag activation scheme 600 according to example embodiments of the present disclosure. As depicted, the first airbag 505 and the second airbag 510 can be activated and the third airbag 510 can be deactivated. At least one of the first airbag and/or the second airbag can be activated based, at least in part, on a position of the cover panel 300. An airbag activation state, for example, for the first airbag 505, the second airbag 510, and/or the third airbag 515 can include an activated state or a deactivated state. As described herein, the activated state or the deactivated state can be indicative of an ON/OFF condition for a respective airbag.

In some implementations, one or more of the first 505, second 510, and/or third airbags 515 can be activated and/or deactivated based on whether the airbag is covered by another airbag. For example, while in the isolating position, the third airbag 515 of the cover panel 300 can cover the second airbag 510 of a control device 270. In addition, while in the exposing position 305, the third airbag 515 of the cover panel 300 can cover the first airbag 505 of the front panel 245 (e.g., positioned in front of a front passenger seat). In each case, the covered airbag (e.g., the first airbag in this case) (e.g., the first 505 and/or second airbags 510, etc.) can be deactivated to prevent interference with the covering airbag (e.g., the third airbag 515). By way of example, the first airbag 505 and the third airbag 515 can be in the activated state and the second airbag 510 can be in the deactivated state when the cover panel 300 is in an isolating position 310. In addition, or alternatively, the second airbag 510 and the third airbag 525 can be in the activated state and the first airbag 505 can be in the deactivated state when the cover panel 300 is in an exposing position.

To change the state of an airbag, the vehicle computing system (or a component thereof) and/or a remote computing system can send one or more signal(s) to an airbag control system associated with the airbag(s). Upon receipt of the signal(s), the airbag control system can adjust the state of the airbag by sending control signal(s) to activate and/or deactivate (e.g., open/close circuits, de-couple/couple mechanical components, apply/remove restrictive forces, etc.) the respective airbag(s). Moreover, the airbag control system can maintain stored data structure (e.g., table, list, etc.) that records the state of an airbag, time of change, type of change, etc. This can allow the airbag control system to track the previous and/or current state of an airbag, as described herein.

Figure 7:
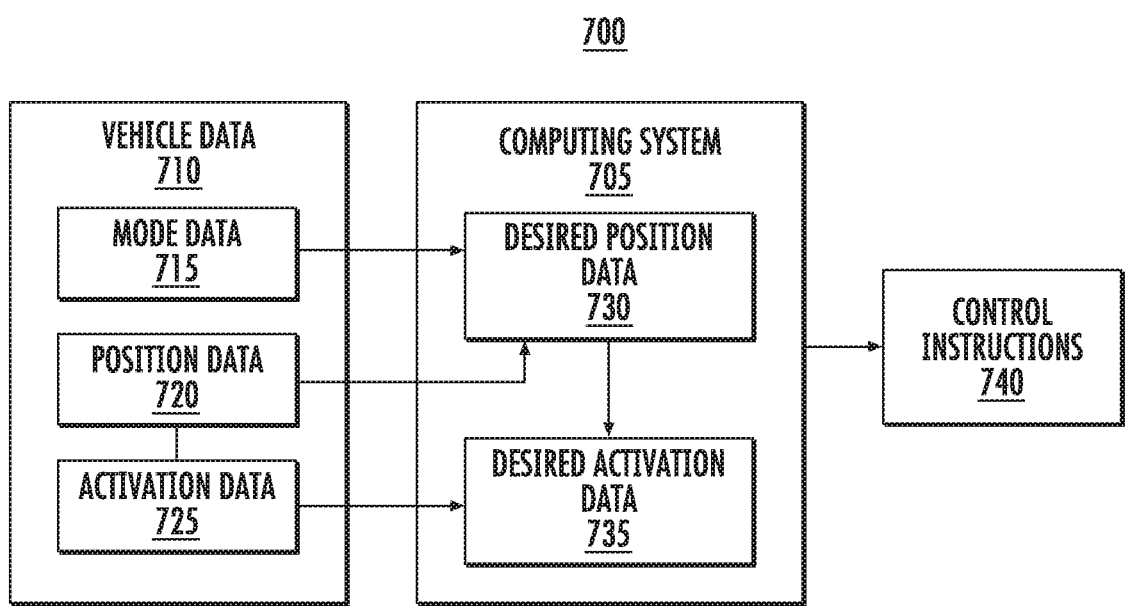
FIG. 7 depicts a dataflow diagram for initiating a positional change of a configurable cover panel according to example embodiments of the present disclosure.

FIG. 7 depicts a dataflow diagram 700 for initiating a positional change of a configurable cover panel according to example embodiments of the present disclosure. A computing system 705 (e.g., vehicle computing system 112, operations computing system 104 of FIG. 1, etc.) can initiate one or more cover panel and/or airbag actions based on one or more aspects of the vehicle's operation (e.g., vehicle operating mode, operational-status modes, etc.). For instance, the computing system 705 can initiate a locking and/or unlocking action, a positional change, an airbag activation/deactivation, and/or any other action associated with the cover panel and/or the one or more airbags of the autonomous vehicle. As an example, the computing system 705 can lock and/or unlock the cover panel and/or automatically reposition the cover panel (and/or activate/deactivate one or more airbags) based on an operating mode/state of the autonomous vehicle.

To do so, the computing system 705 (e.g., vehicle computing system 112, operations computing system 104, etc.) can obtain vehicle data 710 indicative of a vehicle operating mode, the position of the configurable cover panel, and/or the operational state for one or more airbags of the autonomous vehicle. For example, the vehicle data 710 can include vehicle mode data 715, cover panel position data 720, and/or airbag activation data 725. The mode data 715 can be indicative of one or more of a current, preceding, and/or anticipated vehicle operating mode. The cover panel position data 720 can be indicative of one or more of a current, preceding, and/or anticipated cover panel position. And, the airbag activation data 725 can be indicative of a current, preceding, and/or anticipated airbag activation state for one or more airbags (e.g., the first airbag 505, second airbag 510, third airbag 515 of FIG. 5, etc.) of the vehicle.

The computing system 705 can determine a first position (e.g., based on the position data 720) of the cover panel for the autonomous vehicle. The cover panel, for example, can be moveable (e.g., while unlocked) along the front panel of the autonomous vehicle to isolate and/or expose a motion control device of the autonomous vehicle. The computing system 705 can initiate a locking action and/or a positional change for the cover panel based, at least in part, on the vehicle data 710 and the first position (e.g., as indicated by the position data 720). As an example, the computing system 705 can initiate the locking action based, at least in part, on the operating mode (e.g., as indicated by the mode data 715) of the autonomous vehicle. The cover panel, for example, can be locked at the isolating position when the autonomous vehicle is in a fully autonomous mode and/or unlocked when the autonomous vehicle is in a manual mode.

The locking action can include a change to the locking state (e.g., active or inactive) associated with the cover panel and a corresponding action (e.g., locking the cover panel to the first position, unlocking the cover panel from the first position, etc.). The computing system 705 can initiate the locking action by generating control instructions 740 for implementing the locking action and providing the instructions to one or more locking mechanisms (e.g., locking pins, etc.) configured to receive and implement the instructions by locking and/or unlocking the cover panel at the first position. The positional change can include a change from an exposing position to an isolating position, and/or vice versa. The computing system 705 can initiate a positional change by generating control instructions 740 for implementing the positional change and providing the instructions to the panel motor configured to receive and implement the instructions by moving the cover panel in accordance with the positional change.

To initiate an action, the computing system 705 can determine a desired position data 730 for the cover panel. The desired position data 730 can be indicative of a desired position and/or an anticipated desired position for the configurable cover panel. The desired position data 730 can be determined based, at least in part, on the vehicle data 710. For example, the desired position for the cover panel can include the isolating position in the event that the vehicle operating mode (e.g., as indicated by the mode data 715) is a fully autonomous operating mode. In this manner, one or more of the control device(s) can be covered and/or otherwise isolated from the passenger compartment when manual inputs to the control device(s) would interfere with the autonomous operation of the vehicle.

In addition, or alternatively, the desired position for the cover panel can be the exposing position in the event that the vehicle operating mode (e.g., as indicated by the mode data 715) includes the manual operating mode and/or the semi-autonomous operating mode. In this manner, one or more of the control device(s) can be uncovered and/or otherwise accessible from the passenger compartment (e.g., to one or more passengers within the passenger compartment) to enable one or more manual inputs to the control device(s) to control one or more operations of the autonomous vehicle.

In some implementations, the computing system 705 can determine an anticipated desired position for the cover panel. For example, the computing system 705 can determine (e.g., predict, anticipate, etc.) that an operating mode change will occur at a future time (e.g., one or more seconds, minutes, etc. subsequent to a current time) based on the vehicle data 710 (e.g., the mode data 715). This can include, for example, anticipating that the autonomous vehicle will change from a fully autonomous mode into a semi-autonomous or manual operating mode based on an upcoming route segment (e.g., that is unmapped for the autonomous vehicle) and/or scenario (e.g., a crowded urban environment nearby a drop-off location). In such a case, the computing system 705 can determine an anticipated desired position for the cover panel based on the anticipated operating mode change (e.g., as indicated by the mode data 715).

In addition, or alternatively, the computing system 705 can determine the current operating mode and/or a preceding operating mode of the autonomous vehicle based at least in part on the first position (e.g., as indicated by the position data 720) of the cover panel. By way of example, the computing system 705 can determine that the autonomous vehicle is currently and/or was previously operating in a manual and/or semi-autonomous operating mode in the event that the first position of the cover panel is the exposing position. In addition, the computing system 705 can determine that the autonomous vehicle is currently and/or was previously operating in a fully autonomous operating mode in the event that the first position of the cover panel is the isolating position.

In some implementations, the computing system 705 can obtain a current locking state for the cover panel. The current locking state can identify whether the cover panel is locked and/or unlocked to the first position. In the event that the first position is the same as the desired position, the computing system 705 can ensure that the current locking state is active (e.g., the cover panel is locked to the first position). For instance, the computing system 705 can initiate a locking action to lock the cover panel to the first position in the event that the current locking state is inactive (e.g., the cover panel is unlocked). In this manner, the cover panel can be securely fastened to the exposing position (and/or an isolating position) if it is determined that the vehicle is operating in a manual mode (and/or an autonomous mode) to prevent the cover panel from interfering (e.g., by sliding and/or otherwise moving to along the front panel) with an operator of the vehicle.

In addition, or alternatively, the computing system 705 can ensure that the current locking state is inactive if the first position (e.g., as indicated by the position data 720) is different than the desired position and/or anticipated desired position (e.g., as indicated by the desired position data 730). For instance, the computing system 705 can initiate a locking action to unlock the cover panel from the first position in the event that the current locking state is active. In this manner, the cover panel can be unlocked from the first position to enable a passenger or operator of the vehicle to manually move the cover panel. In addition, or alternatively, the cover panel can be unlocked from the first position to enable the computing system 705 to initiate a positional change of the cover panel.

By way of example, the computing system 705 can determine that the first position (e.g., as indicated by the position data 720) is different than the desired position and/or the anticipated desired position (e.g., as indicated by the desired position data 730). For instance, the first position can include the exposing position and a vehicle data 710 (e.g., mode data 715) can indicate that the autonomous vehicle is in a fully autonomous operating mode at the current time and/or be predicted to be in the fully autonomous operating mode at a future time. In such a case, the computing system 705 can determine that the desired and/or anticipated desired position of the cover panel is the isolating position and that the desired (and/or anticipated desired) isolating position is different from the current exposing position. In addition, or alternatively, the first position can include the isolating position and the vehicle data 710 (e.g., mode data 715) can indicate the vehicle is in the manual operating mode at the current time and/or be predicted to be in the manual operating mode at a future time. In such a case, the computing system 705 can determine that the desired (and/or anticipated desired) position of the cover panel is the exposing position and the desired (and/or anticipated desired) exposing position is different from the current isolating position.

In response, the computing system 705 can initiate the positional change of the cover panel from the first position to the desired position at the current time, an anticipated future time, and/or any time therebetween. For example, the computing system 705 can initiate the positional change of the cover panel based on the desired (and/or anticipated desired) position. For instance, the computing system 705 can initiate the positional change of the cover panel from an isolating position to an exposing position at a current time and/or before a predicted mode change from a fully autonomous operating mode to a manual operating mode. In this manner, one or more control devices of the autonomous vehicle can be made available and/or exposed to the passenger compartment before they can be used to operate the vehicle. As another example, the computing system 705 can initiate the positional change of the cover panel from an exposing position to an isolating position at a current time and/or after a predicted mode change from a manual operating mode to a fully autonomous operating mode. In this manner, the one or more control devices of the autonomous vehicle can be isolated from the passenger compartment after they can no longer be used to operate the vehicle.

In some implementations, the computing system 705 can initiate one or more safety actions based on the positional change of the cover panel. By way of example, the computing system 705 can determine one or more safety actions to prepare for the positional change of the cover panel. The one or more safety actions, for example, can include one or more motion control planning actions (e.g., a stopping action to stop the vehicle in-lane or out-of-lane, a parking action to park the vehicle before initiating the positional change of the cover panel), one or more operating mode actions (e.g., to change the operating mode of the autonomous vehicle), one or more operational-status actions (e.g., to change the operational-status of the autonomous vehicle), one or more airbag activation actions (e.g., to change the activation state of one or more airbags of the autonomous vehicle), and/or any other action to ensure the safe transition of the cover panel between an isolating position and an exposing position. As an example, the computing system 705 can generate one or more control instructions 740 (e.g., a first set of instructions) to control the autonomous vehicle to prepare for a change in the operating mode of the vehicle by decelerating to a stopped position, parking at a safe location, securing the vehicle, determining whether passengers are in the vehicle, etc. The computing system 705 can generate one or more control instructions 740 (e.g., a second set of instructions) to initiate the positional change of the cover panel after the autonomous vehicle is prepared for the change in the operating mode of the vehicle.

As another example, the computing system 705 can determine one or more airbag activation actions based on a positional change of the cover panel. For instance, the computing system 705 can determine desired airbag activation data 735 indicative of a desired airbag activation state for each airbag of the vehicle in a similar manner as described above. The computing system 705 can initiate an airbag activation state change for each of the airbags based, at least in part, on the positional change (and/or an anticipated positional change) for the cover panel. For instance, as described herein, the desired activation state for the first airbag and the third airbag can be the activated state and the desired activation state for the second airbag can be the deactivated state when the motion control device of the autonomous vehicle is and/or is anticipated to be isolated by the cover panel. Moreover, the desired activation state for the second airbag and the third airbag can be the activated state and the desired activation state for the first airbag can be the deactivated state when the motion control device of the autonomous vehicle is and/or is anticipated to be exposed by the cover panel. Thus, in the event that a positional change is from an isolating position to an exposing position, the computing system 705 can activate the second airbag and deactivate the first airbag, and/or vice versa.

Figure 8:
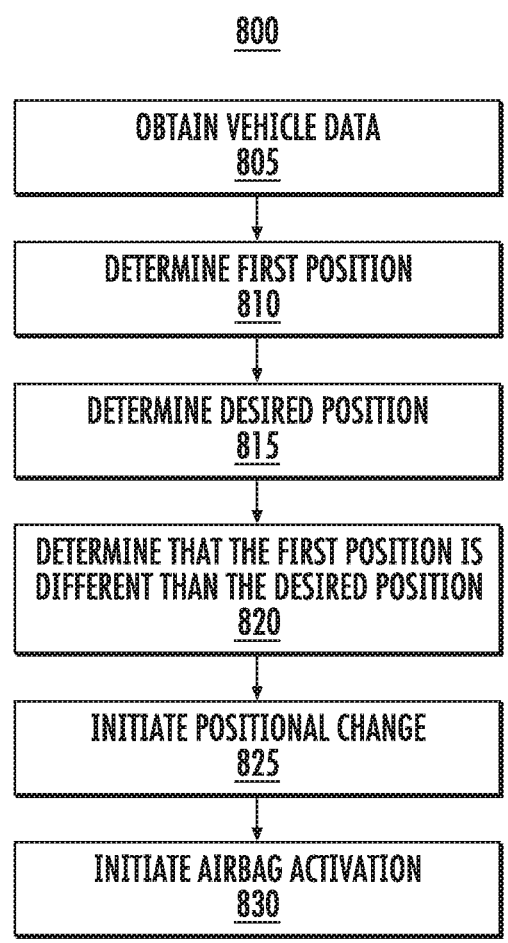
FIG. 8 depicts a flowchart of a method for initiating a positional change of a configurable cover panel according to example embodiments of the present disclosure.

Turning to FIG. 8, FIG. 8 depicts a flowchart of a method 800 for initiating a reconfiguration response according to example embodiments of the present disclosure. One or more portion(s) of the method 800 can be implemented by a computing system that includes one or more computing devices such as, for example, the computing systems described with reference to the other figures (e.g., the computing system 705, operations computing system 104, vehicle computing system 112, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-6, etc.), for example, to adjust the position of a cover panel for an autonomous vehicle. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/ terms described with respect to other systems and figures for exemplary illustrated purposes and is not meant to be limiting. One or more portions of method 800 can be performed additionally, or alternatively, by other systems.

At 805, the method 800 can include obtaining vehicle data. For example, a computing system (e.g., computing system 705, vehicle computing system 112, operation computing systems 104, etc.) can obtain vehicle data indicative of an operating mode for an autonomous vehicle. The autonomous vehicle can include a passenger compartment defining a longitudinal direction, a lateral direction, and a vertical direction. The passenger compartment can have a forward end and a rear end spaced apart from the forward end along the longitudinal direction. The passenger compartment can include a front panel disposed proximate to the front end of the passenger compartment (e.g., closer to the front end than an opposing rear end), a vehicle motion control device located at the front panel, and/or a cover panel located at the front panel. The cover panel can be moveable relative to the front panel between an isolating position and an exposing position. The cover panel can isolate the vehicle motion control device from the passenger compartment when in the isolating position.

At 810, the method 800 can include determining a first position. For example, a computing system (e.g., computing system 705, vehicle computing system 112, operation computing systems 104, etc.) can determine the first position of the cover panel for the autonomous vehicle. The cover panel, for example, can be movable along a front panel of the autonomous vehicle to isolate and expose a motion control device of the autonomous vehicle. The first position of a cover panel for the autonomous vehicle can be determined from among a plurality of positions. The plurality of positions can include an isolating position in which the cover panel substantially isolates a motion control device of the autonomous vehicle from a passenger compartment of the autonomous vehicle and an exposing position in which the motion control device is exposed to the passenger compartment of the autonomous vehicle.

At 815, the method 800 can include determining a desired position. For example, a computing system (e.g., computing system 705, vehicle computing system 112, operations computing system 104, etc.) can determine the desired position for the cover panel based on the vehicle data.

At 820, the method 800 can include determining that the first position is different than the desired position. For example, a computing system (e.g., computing system 705, vehicle computing system 112, operations computing system 104, etc.) can determine that the first position is different than the desired position.

At 825, the method 800 can include initiating a positional change. For example, a computing system (e.g., computing system 705, vehicle computing system 112, operations computing system 104, etc.) can initiate a positional change for the cover panel based on the vehicle data and the first position. In some implementations, the computing system can initiate the positional change of the cover panel from the first position to the desired position in response to determining that the first position is different than the desired position.

At 830, the method 800 can include initiation an airbag activation. For example, a computing system (e.g., computing system 705, vehicle computing system 112, operations computing system 104, etc.) can initiate an airbag activation state change base on the positional change for the cover panel.

Figure 9:
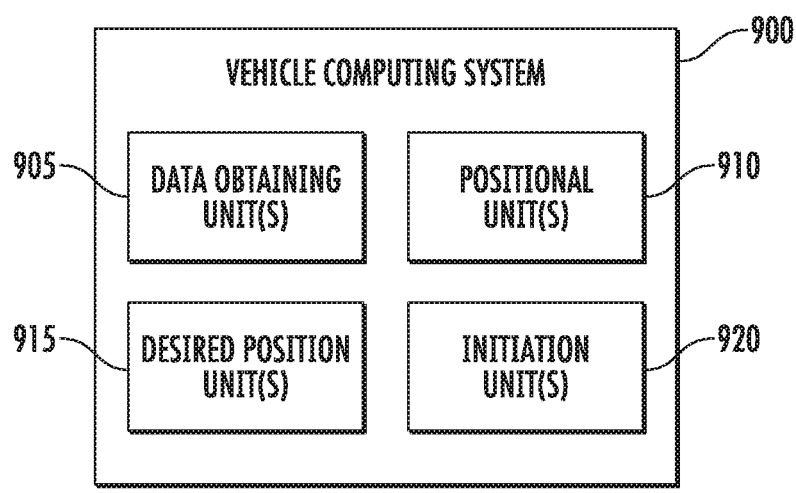
FIG. 9 depicts example units associated with a computing system for performing operations and functions according to example embodiments of the present disclosure.

Turning to FIG. 9, various means can be configured to perform the methods and processes described herein. For example, a computing system 900 can include data obtaining unit(s) 905, positional unit(s) 910, desired unit(s) 915, initiation unit(s) 920, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 905, etc.) can be configured to obtain vehicle data indicative of a vehicle operating mode for an autonomous vehicle. The means (e.g., positional unit(s) 910, etc.) can be configured to determine a first position of a cover panel for the autonomous vehicle. The cover panel, for example, can be moveable along a front panel of the autonomous vehicle to isolate and/or expose a motion control device of the autonomous vehicle. The means (e.g., desired position unit(s) 915, etc.) can be configured to determine a desired position for a cover panel based, at least in part, on the vehicle data. The means (e.g., initiation unit(s) 920, etc.) can be configured to initiate a positional change for the cover panel based, at least in part, on the vehicle data and the first position. In addition, the means (e.g., initiation unit(s) 920, etc.) can be configured to determine that the first position is different than the desired position and, in response, initiate the positional change of the cover panel from the first position to the desired position.

FIG. 10 depicts example system components of an example system 1000 according to example embodiments of the present disclosure. The example system 1000 can include the computing system 1005 (e.g., a vehicle computing system 112, operations computing system 104, computing system 705, etc.) and the computing system 1050 (e.g., a vehicle computing system 112, operations computing system 104, computing system 705, etc.) that are communicatively coupled over one or more network(s) 1045.

The computing system 1005 can include one or more computing device(s) 1010. The computing device(s) 1010 of the computing system 1005 can include processor(s) 1015 and a memory 1020. The one or more processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 to perform operations such as any of the operations and functions for which the computing systems (e.g., computing system 705, vehicle computing system 112, operations computing system 105, etc.) are configured, as described herein.

The memory 1020 can store data 1030 that can be obtained, received, accessed, written, manipulated, created, and/or stored. The data 1030 can include, for instance, vehicle data, mode data, position data, activation data, and/or other data/information described herein. In some implementations, the computing device(s) 1010 can obtain from and/or store data in one or more memory device(s) that are remote from the computing system 1005 such as one or more memory devices of the computing system 1050.

The computing device(s) 1010 can also include a communication interface 1035 used to communicate with one or more other system(s) (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The one or more computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the one or more processors 1060. For instance, the memory 1065 (e.g., one or more non-transitory computer-readable storage mediums, memory devices) can store data 1075 that can be obtained, received, accessed, written, manipulated, created, and/or stored. The data 1075 can include, for instance, vehicle data, mode data, position data, activation, desired position data, desired activation data, and/or other data/information described herein. In some implementations, the computing system 1050 can obtain data from one or more memory device(s) that are remote from the computing system 1050.

The memory 1065 can also store computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060. For example, the memory 1065 can store instructions 1070 that when executed by the one or more processors 1060 cause the one or more processors 1060 to perform any of the operations and/or functions described herein, including, for example, any of the operations and functions of the devices described herein, and/or other operations and functions.

The computing device(s) 1055 can also include a communication interface 1080 used to communicate with one or more other system(s). The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The network(s) 1045 can be any type of network or combination of networks that allows for communication between devices. In some embodiments, the network(s) 1045 can include one or more of a local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at a vehicle computing system can instead be performed remote from the vehicle computing system (e.g., via operations computing system, one or more other remote devices, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle comprising a passenger compartment defining a longitudinal direction, a lateral direction, and a vertical direction, the passenger compartment having a forward end and a rear end spaced apart from the forward end along the longitudinal direction, the passenger compartment comprising:
a front panel disposed proximate to the forward end of the passenger compartment;
a vehicle motion control device connected to the front panel; and
a cover panel affixed to the front panel, the cover panel moveable relative to the front panel between an isolating position and an exposing position, the cover panel isolating the vehicle motion control device from the passenger compartment when in the isolating position;
wherein the cover panel comprises a sliding panel coupled to the front panel by one or more tracks, and wherein the cover panel is configured to slide along the one or more tracks to move between the isolating position and the exposing position.

2. The autonomous vehicle of claim 1, wherein the vehicle motion control device is exposed to the passenger compartment of the autonomous vehicle when the cover panel is in the exposing position.

3. The autonomous vehicle of claim 1, wherein the vehicle motion control device comprises a steering device.

4. The autonomous vehicle of claim 3, wherein the front panel comprises a receding portion, and wherein the steering device is coupled to the receding portion by a telescopic actuator configured to recede within the receding portion of the front panel.

5. The autonomous vehicle of claim 1, wherein the one or more tracks are positioned along the lateral direction of the front panel.

6. The autonomous vehicle of claim 1, wherein the one or more tracks are positioned along the vertical direction of the front panel.

7. The autonomous vehicle of claim 1, wherein the front panel comprises a first airbag, the vehicle motion control device comprises a second airbag, and the cover panel comprises a third airbag.

8. The autonomous vehicle of claim 7, wherein at least one of the first airbag or the second airbag is activated based, at least in part, on a position of the cover panel.

9. The autonomous vehicle of claim 7, wherein the vehicle motion control device is located in front of a first passenger seat within the passenger compartment of the autonomous vehicle, and wherein the first airbag is located within the front panel in front of a second passenger seat within the passenger compartment of the autonomous vehicle, and wherein the first passenger seat is spaced apart from the second passenger seat along the lateral direction of the passenger compartment.

10. A computer-implemented method of adjusting a position of a cover panel for an autonomous vehicle, the method comprising:
obtaining vehicle data indicative of an operating mode for the autonomous vehicle;
determining a first position of the cover panel for the autonomous vehicle, wherein the cover panel is moveable along a front panel of the autonomous vehicle to isolate and expose a motion control device of the autonomous vehicle, wherein the cover panel comprises a sliding panel coupled to the front panel by one or more tracks, and wherein the cover panel is configured to slide along the one or more tracks to move between an isolating position and an exposing position; and
initiating a positional change for the cover panel based, at least in part, on the vehicle data and the first position.

11. The computer-implemented method of claim 10, wherein the cover panel is movable between the isolating position and the exposing position, wherein the cover panel is configured to substantially isolate the motion control device of the autonomous vehicle when positioned at the isolating position, wherein the motion control device is exposed to a passenger compartment of the autonomous vehicle when the cover panel is in the exposing position.

12. The computer-implemented method of claim 11, wherein the operating mode comprises at least one of a manual operating mode, a semi-autonomous operating mode, or a fully autonomous operating mode.

13. The computer-implemented method of claim 12, wherein initiating the positional change for the cover panel based, at least in part, on the vehicle data and the first position comprises:
determining a desired position for the cover panel based, at least in part, on the vehicle data;
determining that the first position is different than the desired position; and in response, initiating the positional change of the cover panel from the first position to the desired position.

14. The computer-implemented method of claim 13, wherein the desired position for the cover panel is the isolating position when the operating mode is the fully autonomous operating mode, and wherein the desired position for the cover panel is the exposing position when the operating mode is the manual operating mode or the semi-autonomous operating mode.

15. The computer-implemented method of claim 10, wherein the front panel comprises a first airbag, the motion control device comprises a second airbag, and the cover panel comprises a third airbag.

16. The computer-implemented method of claim 15, wherein the vehicle data further comprises an airbag activation state for the first airbag, the second airbag, and the third airbag, and wherein the method further comprises:
 initiating an airbag activation state change based, at least in part, on the positional change for the cover panel.

17. The computer-implemented method of claim 16, wherein the airbag activation state for the first airbag, the second airbag, and the third airbag comprises an activated state or a deactivated state, and wherein the first airbag and the third airbag are in the activated state and the second airbag is in the deactivated state when the motion control device of the autonomous vehicle is isolated by the cover panel.

18. The computer-implemented method of claim 16, wherein the airbag activation state for the first airbag, the second airbag, and the third airbag comprises an activated state or a deactivated state, and wherein the second airbag and the third airbag are in the activated state and the first airbag is in the deactivated state when the motion control device of the autonomous vehicle is exposed by the cover panel.

19. A computing system comprising one or more processors; and
 one or more non-transitory computer-readable media that store instructions that, when executed by the one or more processors, cause the computing system to perform operations, the operations comprising:
  obtaining vehicle data indicative of an operating mode of an autonomous vehicle;
  determining a first position of a cover panel for the autonomous vehicle from among a plurality of positions, wherein the plurality of positions comprise an isolating position in which the cover panel substantially isolates a motion control device of the autonomous vehicle from a passenger compartment of the autonomous vehicle and an exposing position in which the motion control device is exposed to the passenger compartment of the autonomous vehicle, wherein the cover panel comprises a sliding panel coupled to the front panel by one or more tracks, and wherein the cover panel is configured to slide along the one or more tracks to move between the isolating position and the exposing position; and
 initiating a positional change for the cover panel based, at least in part, on the vehicle data and the first position.

20. The computing system of claim 19, wherein the operations further comprise:
 initiating a change associated with an airbag based, at least in part, on the positional change for the cover panel.

* * * * *